US012583278B2

(12) United States Patent
Myers

(10) Patent No.: US 12,583,278 B2
(45) Date of Patent: Mar. 24, 2026

(54) PNEUMATIC GAUGE AND PRESSURE CONTROL DEVICE AND PNEUMATIC SYSTEM INCLUDING SAME

(71) Applicant: James Richard Myers, Naples, FL (US)

(72) Inventor: James Richard Myers, Naples, FL (US)

( * ) Notice: Subject to any disclaimer, the term of this patent is extended or adjusted under 35 U.S.C. 154(b) by 0 days.

(21) Appl. No.: 18/133,305

(22) Filed: Apr. 11, 2023

(65) Prior Publication Data

US 2023/0322040 A1     Oct. 12, 2023

Related U.S. Application Data

(60) Provisional application No. 63/417,156, filed on Oct. 18, 2022, provisional application No. 63/329,858, filed on Apr. 11, 2022.

(51) Int. Cl.
*B60G 17/052* (2006.01)
*F04B 49/02* (2006.01)
(Continued)

(52) U.S. Cl.
CPC .................... *B60G 17/0528* (2013.01); *B60G 2400/51222* (2013.01); *B60G 2500/2042* (2013.01);
(Continued)

(58) Field of Classification Search
CPC ...... B60G 17/0528; B60G 2400/51222; B60G 2500/2042; B60G 2500/2044;
(Continued)

(56) References Cited

U.S. PATENT DOCUMENTS 3,096,788 A * 7/1963 Talbot ................... F16K 11/085
137/625.21
3,104,114 A * 9/1963 Vogel ................. B60G 17/0525
137/596.1
(Continued)

FOREIGN PATENT DOCUMENTS

EP          1691115 B1     9/2009
EP          1395453 B1     3/2011

OTHER PUBLICATIONS

Xtra Air Command (Ride-Rite) 2266, Installation Instructions, 4 pps., Nov. 2016.
(Continued)

*Primary Examiner* — Minh Q Le
(74) *Attorney, Agent, or Firm* — Lippes Mathias LLP

(57)          ABSTRACT

A pneumatic gauge and pressure control device includes a pneumatic gauge that is manually movable from a neutral position to: (i) a fill position for compressed air to flow from a compressed air source into a system; or (ii) a vent position for compressed air to be vented from the system. The pneumatic gauge can rotate or slide from the neutral position to the fill and vent positions. A method for controlling a flow of compressed air with respect to a pneumatic system includes manually moving a pneumatic pressure gauge from a neutral position to a fill position to cause compressed air to be communicated from an associated compressed air source into the pneumatic system and/or moving the pneumatic gauge from the neutral position or from the fill position to a vent position to cause compressed air to be vented from the pneumatic system.

19 Claims, 18 Drawing Sheets

(51) Int. Cl.

| | |
|---|---|
| *G01F 13/00* | (2006.01) |
| *G01F 15/00* | (2006.01) |
| *G01L 17/00* | (2006.01) |
| *G01L 19/00* | (2006.01) |
| *G01L 19/16* | (2006.01) |
| *G05D 7/00* | (2006.01) |
| *G05D 16/00* | (2006.01) |

(52) U.S. Cl.
CPC .... *B60G 2500/2044* (2013.01); *F04B 49/022* (2013.01); *G01F 13/00* (2013.01); *G01F 15/00* (2013.01); *G01L 17/00* (2013.01); *G01L 19/003* (2013.01); *G01L 19/16* (2013.01); *G05D 7/00* (2013.01); *G05D 16/00* (2013.01)

(58) Field of Classification Search
CPC ........ F04B 49/022; G01F 13/00; G01F 15/00; G01L 17/00; G01L 19/003; G01L 19/16; G05D 16/00; G05D 7/00
USPC .... 137/627, 625.11, 625.12, 625.25, 625.17, 137/625.2, 625.21, 627.5, 596.16, 601.16, 137/557
See application file for complete search history.

(56) References Cited

U.S. PATENT DOCUMENTS

| | | | | |
|---|---|---|---|---|
| 3,476,150 | A * | 11/1969 | Loewenthal | ........ F16K 11/0743 |
| | | | | 137/884 |
| 3,511,273 | A * | 5/1970 | Rainer | ................ G01L 19/0015 |
| | | | | 137/557 |
| 3,836,161 | A | 9/1974 | Buhl | |
| 4,049,019 | A * | 9/1977 | McClocklin | .......... F16K 11/074 |
| | | | | 137/625.21 |
| 4,355,658 | A * | 10/1982 | Snyder | ................ F16K 37/0008 |
| | | | | 137/553 |
| 4,976,104 | A | 12/1990 | Morris et al. | |
| 5,447,178 | A | 9/1995 | Gabrlik et al. | |
| 5,573,034 | A | 11/1996 | Gabrlik et al. | |
| 5,707,045 | A * | 1/1998 | Easter | ...................... F16F 9/05 |
| | | | | 188/1.11 E |
| 5,860,450 | A * | 1/1999 | Trudeau | ............. B60G 17/0525 |
| | | | | 280/124.16 |
| 5,881,770 | A * | 3/1999 | Neill | ................... F16K 11/0743 |
| | | | | 251/297 |
| 7,117,890 | B2 * | 10/2006 | Ching | ................ B60G 17/0525 |
| | | | | 251/319 |
| 7,841,608 | B2 * | 11/2010 | Morris | ............... B60G 17/0523 |
| | | | | 280/124.16 |
| 8,523,191 | B2 * | 9/2013 | Yagiela | ................. B60G 17/019 |
| | | | | 280/5.514 |
| 10,040,331 | B2 * | 8/2018 | Gandhi | ................. F16K 11/074 |
| 10,093,145 | B1 * | 10/2018 | Vaughan | ............ B60G 17/0155 |
| 10,836,232 | B2 * | 11/2020 | Plath | ................... B60G 17/019 |
| 10,913,322 | B2 * | 2/2021 | Vaughan | ............ B60G 17/0155 |
| 2003/0067124 | A1 * | 4/2003 | Kang | ................. B60G 17/0485 |
| | | | | 280/5.514 |
| 2004/0108638 | A1 * | 6/2004 | Weber | ....................... F16F 9/42 |
| | | | | 267/64.21 |
| 2006/0175775 | A1 | 8/2006 | Bolt et al. | |
| 2009/0050219 | A1 | 2/2009 | Firoenza et al. | |
| 2009/0194179 | A1 * | 8/2009 | Morris | ............... B60G 17/0525 |
| | | | | 137/625.11 |
| 2012/0227662 | A1 | 9/2012 | Coombs | |
| 2021/0061040 | A1 | 3/2021 | Coombs et al. | |

OTHER PUBLICATIONS

Heavy Duty Air Command (Ride-Rite) 2097/2227, Installation Instructions, 4 pps., Feb. 2017.
International Search Report, PCT Application No. PCT/US2023/018164, 3 pps., Jul. 14, 2023.
Written Opinion of the International Searching Authority, PCT Application No. PCT/US2023/018164, 6 pps., Jul. 14, 2023.
LoadController Single by Air Lift, Kits 25850 and 25854 Single Gauge Analog Compressor Systems, Installation Guide, 16 pps., Nov. 2010.
LoadController / Dual by Air Lift, Kits 25852 and 25856 Dual Gauge Analog Compressor Systems, Installation Guide, 16 pps., Aug. 2010.
Norgren Height Control Seat Valve (3013 / 251-12A / 134-4), 2 pps., Sep. 2014.

* cited by examiner

PNEUMATIC GAUGE AND PRESSURE CONTROL DEVICE AND PNEUMATIC SYSTEM INCLUDING SAME

CROSS-REFERENCE TO RELATED APPLICATIONS

This application claims priority from and benefit of the filing date of U.S. provisional application Ser. No. 63/329,858 filed Apr. 11, 2022, and U.S. provisional application Ser. No. 63/417,156 filed Oct. 18, 2022. The entire disclosure of said prior provisional application Ser. No. 63/329,858 and the entire disclosure of said prior provisional application Ser. No. 63/417,156 are both hereby expressly incorporated by reference into the present application.

FIELD

The present development relates to the field of pneumatic gauges and control systems for vehicles and other applications. More particularly, the present development relates to a combined pneumatic gauge and pressure control device that provides a novel and nonobvious device and method for controlling the flow of pressurized air from a source to a destination device or system such as an air spring, tire, or other pneumatic chamber and for controlling the venting of pressurized air from the air spring, tire, or other pneumatic chamber of a device or system. The destination device or system such as a tire, air spring or other pneumatic chamber can be a component of a commercial vehicle or passenger vehicle or can be a part of a non-vehicular pneumatic system such as industrial or manufacturing equipment, motion control systems, or other applications. The development is described herein with primary reference to vehicle air springs but those of ordinary skill in the art will recognize that it can be used in connection with other vehicle-based or non-vehicle pneumatic systems or devices where pressurized air must be selectively communicated to and vented from a chamber or other system or destination.

BACKGROUND

Existing pneumatic control systems for air springs or other systems use a mounted pressure gauge to detect and display the air pressure contained in the air spring or other system and include a separate pneumatic control system including an electrical switch and/or a pneumatic valve actuator that can be located adjacent the gauge or remote from the gauge for controlling the flow of pressurized air into the air spring or other system or device from a compressed air source and for venting pressurized air from the air spring or other system or device to the atmosphere. In some cases, the control system comprises a manually controlled pneumatic valve including an actuator to be manually operated by a user. In other applications, the control system comprises a solenoid valve or other electro-mechanically actuated pneumatic valve and an electrical switch to be operated by a user. In other designs, an electrical switch operated by the user directly controls the operation of an air compressor that feeds compressed air to the system.

These known designs have been found to be suboptimal for a wide variety of reasons including the need to provide a system with a pressure control switch or actuator that is separate from the pressure gauge itself. As such, a need has been identified for a new and improved pneumatic gauge and pressure control device that overcomes this deficiency and others associated with known systems while providing superior overall results.

SUMMARY OF THE PRESENT DEVELOPMENT

In accordance with one aspect of the present development, a pneumatic gauge and pressure control device includes a pneumatic gauge that is manually movable from a neutral position to either: (i) a fill position in which the pneumatic gauge and pressure control device causes compressed air to be communicated from an associated compressed air source into an associated device or system; (ii) a vent position in which the pneumatic gauge and pressure control device causes compressed air to be vented from the associated device or system.

In accordance with another aspect of the present development, the pneumatic gauge of the device is rotatable about an axis from the neutral position to the fill position and the vent position or is slidable along an axis from the neutral position to the fill position and the vent position.

In accordance with a further aspect of the present development a method for controlling a flow of compressed air with respect to a pneumatic system includes manually moving a pneumatic pressure gauge from a neutral position to a fill position to cause compressed air to be communicated from an associated compressed air source into the pneumatic system.

In accordance with another aspect of the present development, the method further includes manually moving the pneumatic gauge from the neutral position or from the fill position to a vent position to cause compressed air to be vented from the pneumatic system.

In accordance with a further aspect of the present development, the step of manually moving the pneumatic pressure gauge comprises rotating the pneumatic pressure gauge about an axis of rotation.

BRIEF DESCRIPTION OF THE DRAWINGS

Embodiments of the present development are described with reference to the following drawings wherein.

DETAILED DESCRIPTION

Figure 1:
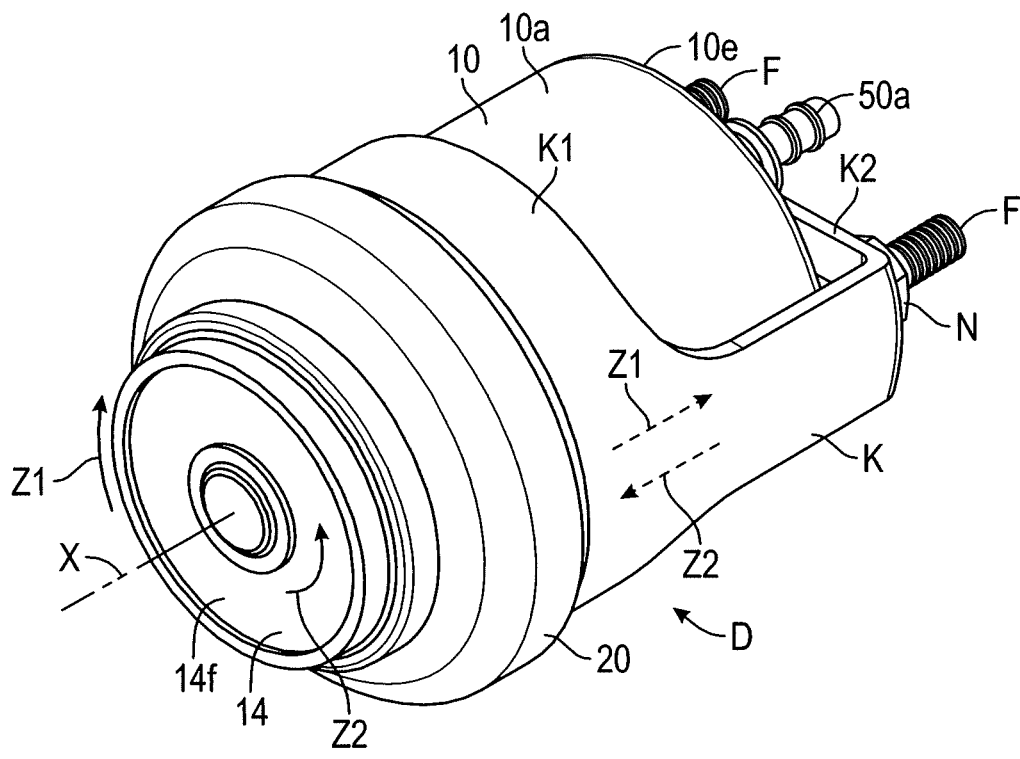
FIG. 1 is a front isometric view of a pneumatic gauge and pressure control device provided in accordance with an embodiment of the present development.
Figure 2:
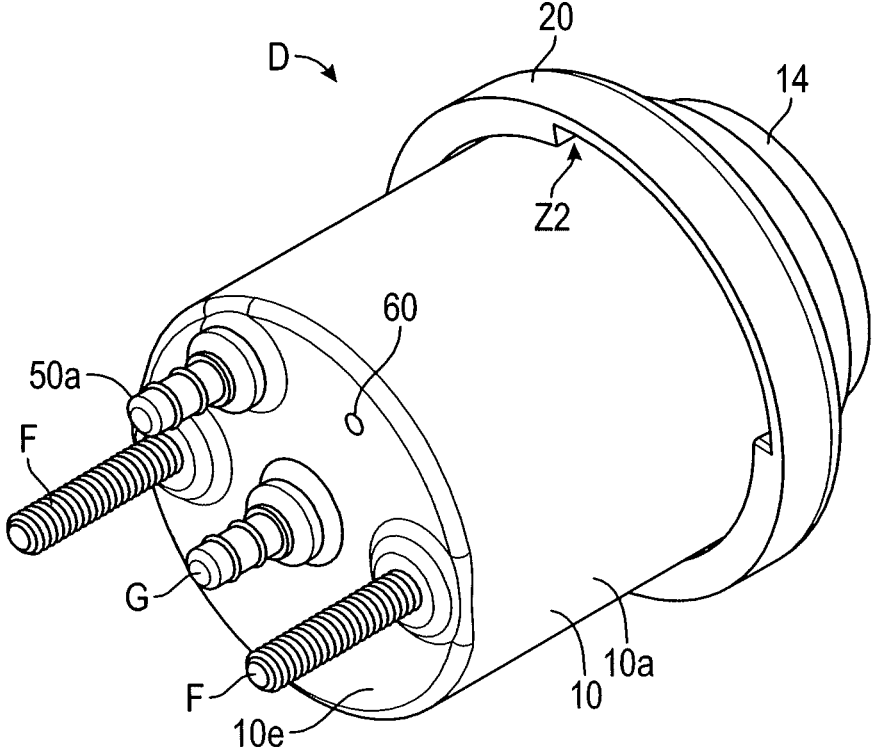
FIG. 2 is a rear isometric view of the pneumatic gauge and pressure control device of FIG. 1.
Figure 3:
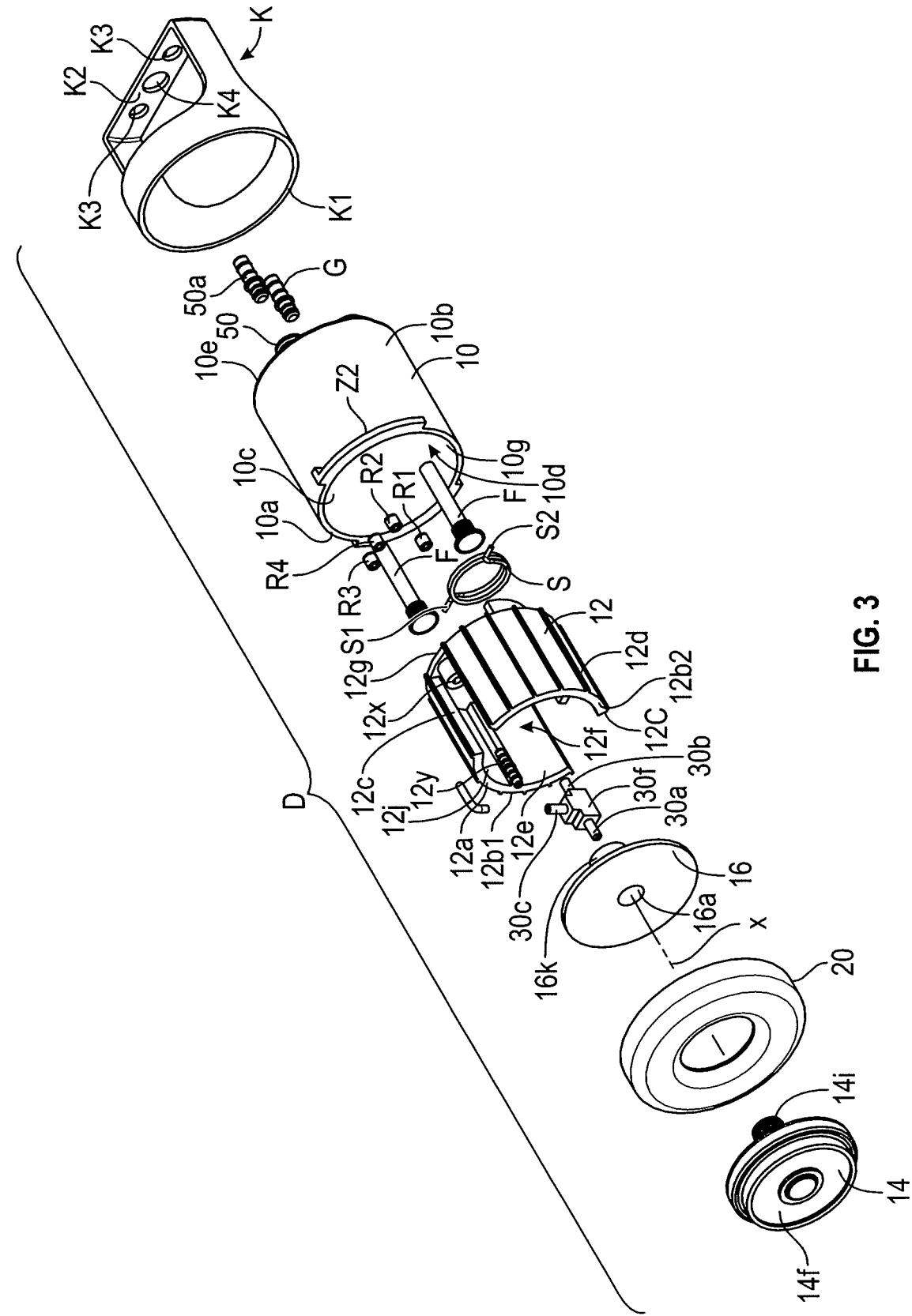
FIG. 3 is an exploded, front isometric view of the pneumatic gauge and pressure control device of FIG. 1.

FIGS. 1-3 are respective front, rear, and exploded isometric views of a pneumatic gauge and pressure control device D provided in accordance with an embodiment of the present development. The device comprises a first or outer body 10 that can comprise a cup-like structure including an annular wall 10a that includes an outer surface 10b that can be cylindrical or otherwise shaped and that comprises an inner surface 10c that can be cylindrical or otherwise conformed to define a main bore 10d. The first body 10 comprises an inner end wall 10e that extends across and at least partially closes an inner end 10f (see also FIG. 6A) of the main bore 10d, and the opposite outer end 10g of the main bore 10d can be open. The first/outer body 10 can be a one-piece molded polymeric structure or can be assembled from two or more polymeric, metallic and/or other first body pieces.

Figures 4, 4A, 4B, 4C:
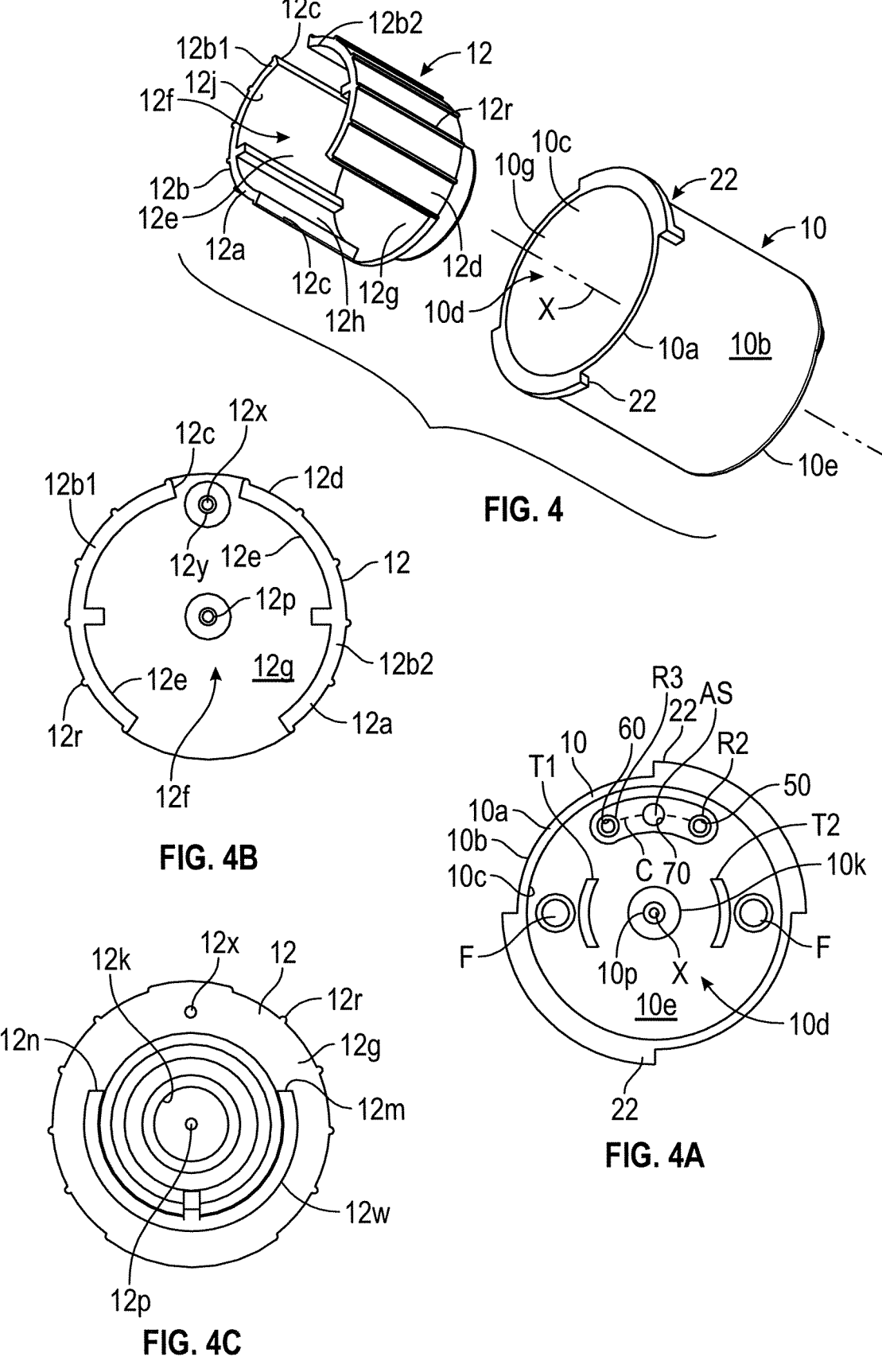
FIG. 4 is an exploded, isometric view of the first or outer body and the second or inner body.
FIG. 4A is a front view of the first (outer) body of FIG. 4.
FIG. 4B is a front view of the second (inner) body of FIG. 4.
FIG. 4C is a rear view of the second (inner) body of FIG. 4.

With particular reference to FIGS. 3 & 4, the device D further comprises a second or inner body 12 that is at least partially or fully installed in the main bore 10d of the first body 10 and supported for at least limited angular rotation relative to the first body 10 about an axis of rotation X. As shown in the illustrated embodiment, the second body 12 is coaxially installed in the main bore 10d. The second body 12 comprises a main wall 12g that can be circular in its peripheral shape or otherwise shaped at its periphery. In the illustrated embodiment of FIGS. 3-4, the second body 12 can be generally cup-shaped and can comprise an annular wall 12a connected to and projecting axially outward from the main wall 12g and that can be circumferentially continuous or that can include first and second cylindrical or otherwise conformed wall segments 12b1, 12b2 circumferentially separated by one or more gaps 12c. The second body annular wall 12a can comprise an outer surface 12d that can be cylindrical or otherwise shaped (as shown it includes a plurality of axially extending ribs 12r) and comprises an inner surface 12e that can be cylindrical or otherwise conformed to define an interior space such as a secondary bore 12f. The main wall 12g can extend across and at least partially close an inner end 12h (FIG. 4) of the secondary bore 12f so as to provide and act as an inner end wall. The second body 12 can be a one-piece molded polymeric structure or can be assembled from two or more polymeric, metallic and/or other first body pieces. As noted, the second body 12 is rotatably supported relative to the first body 10 for at least limited angular rotation relative to the first body 10 about an axis of rotation X which also defines a longitudinal axis of the device D. As described in detail below with reference to FIGS. 13 to 18, the second body 12 can alternatively omit the annular wall 12a (i.e., omit the wall segments 12b1, 12b2) such that the second body 12 comprises the main wall 12g in the form of a disc-shaped body.

The pneumatic gauge and pressure control device D comprises a pneumatic pressure gauge 14 (FIGS. 1-3) that can be a mechanical analog pressure gauge or a battery-operated digital pressure gauge. The pressure gauge includes an inlet fitting 14i configured to fluidically connect with a pneumatic system associated with and/or including the pneumatic gauge and pressure control device D and includes a face 14f that provides an analog or digital indication of pneumatic pressure sensed at the inlet fitting 14i. The pressure gauge 14 is operatively connected to the second body 12 for rotation therewith such that manual angular or rotational movement of the pressure gauge 14 about the axis X by a user causes or induces corresponding angular movement or rotation of the second body 12 about the axis of rotation X relative to the first body 10 together with the pressure gauge 14 and, correspondingly, manual angular or rotational movement of the second body 12 about the axis of rotation X by a user causes or induces corresponding angular movement or rotation of the pressure gauge 14 about the axis of rotation X relative to the first body 10 together with the second body 12.

The pneumatic gauge and pressure control device D can comprise a gauge plate 16 or gauge mounting plate 16 that is operatively non-rotatably connected to the second body 12 so as to rotate together with the second body about the axis of rotation X and that can extend across and at least partially close an open outer end 12*j* of the second bore 12*f* to provide a mounting location for the pneumatic pressure gauge 14 so that the pressure gauge 14 can be operatively non-rotatably connected to the second body 12 for rotation therewith about the axis of rotation X. The gauge plate 16 can be snap-fit, friction fit, interlocked, engaged, welded, adhesively secured and/or otherwise non-rotatably secured or connected to the second body 12 as an assembly as shown herein or it can alternatively be formed as part of the second body 12. e.g., as a one-piece construction together with the second body 12 or any part of the second body 12. In the illustrated example, the pressure gauge 14 comprises an externally threaded male inlet fitting 14*i* that is threaded into and engaged with an internally threaded female gauge mounting aperture 16*a* of the gauge plate 16. The threaded male fitting 14*i* is firmly engaged in the mounting aperture 16*a* by friction and/or by using adhesive so that during normal operative use of the device D, manual rotation of the pressure gauge 14 in clockwise or counter-clockwise directions about the axis of rotation X causes corresponding 1:1 rotation of the gauge plate 16 and second body 12 about the axis of rotation X without any relative rotational movement between the fitting 14*i* and threaded aperture 16*a* of the gauge plate 16 as would lead to loosening or disconnection of the pressure gauge 14 from the threaded aperture 16*a* of the gauge plate 16, although the pressure gauge 14 can be intentionally unthreaded from the aperture 16*a* of the gauge plate for repair and/or replacement by restraining the gauge plate 16 and second body 12 and using force beyond normal operative force to unthread the pressure gauge from the gauge plate 16. In an alternative embodiment, the pressure gauge inlet fitting 14*i* can be interference fit or press-fit or otherwise non-rotatably connected to the gauge plate 16 for rotation therewith and/or the pressure gauge inlet fitting 14*i* can comprise a hexagonal or other non-circular outer shape that is non-rotatably keyed to the gauge plate aperture 16*a* to ensure that the pressure gauge 14 and gauge plate 16 rotate together when the pressure gauge 14 is operatively connected to the gauge plate 16. The threaded gauge plate aperture 16*a* can be molded as part of the polymeric structure of the gauge plate or a metal nut or other metallic or non-metallic female aperture insert can be included to provide the threaded aperture 16*a*.

Figure 6:
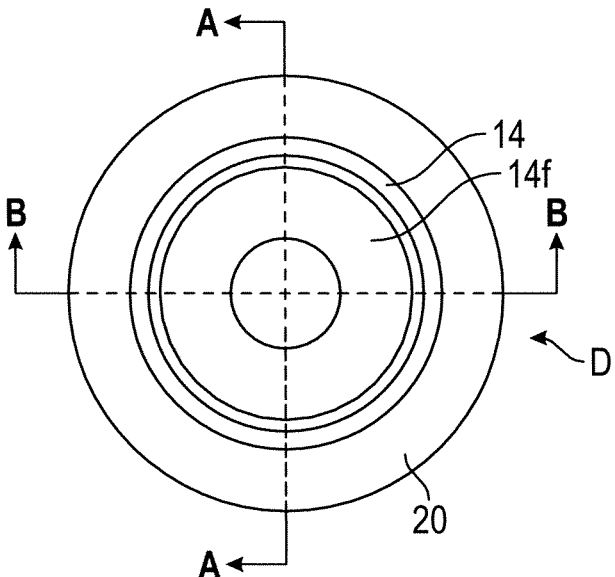
FIG. 6 is a front view of the gauge and pressure control device of FIG. 1, with the device in its first/neutral position corresponding to FIG. 5A.
Figure 6A:
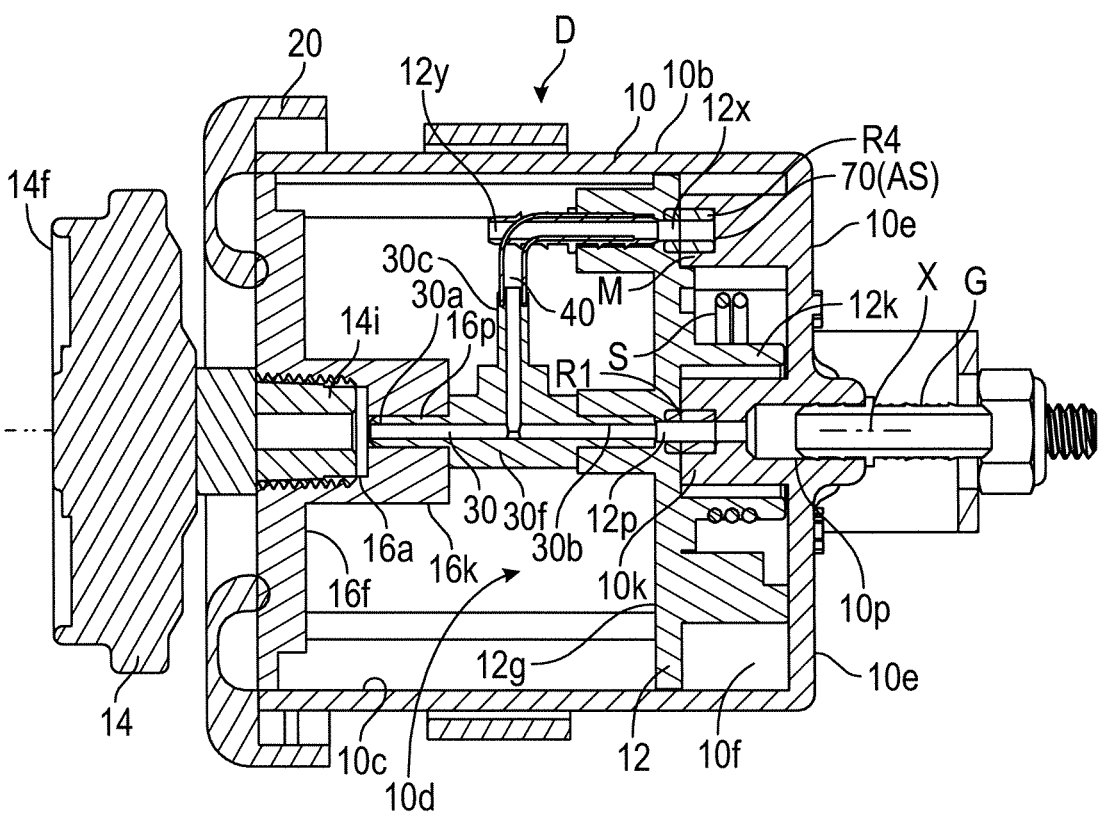
FIG. 6A is a section view of the device as taken at A-A of FIG. 6.
Figure 6B:
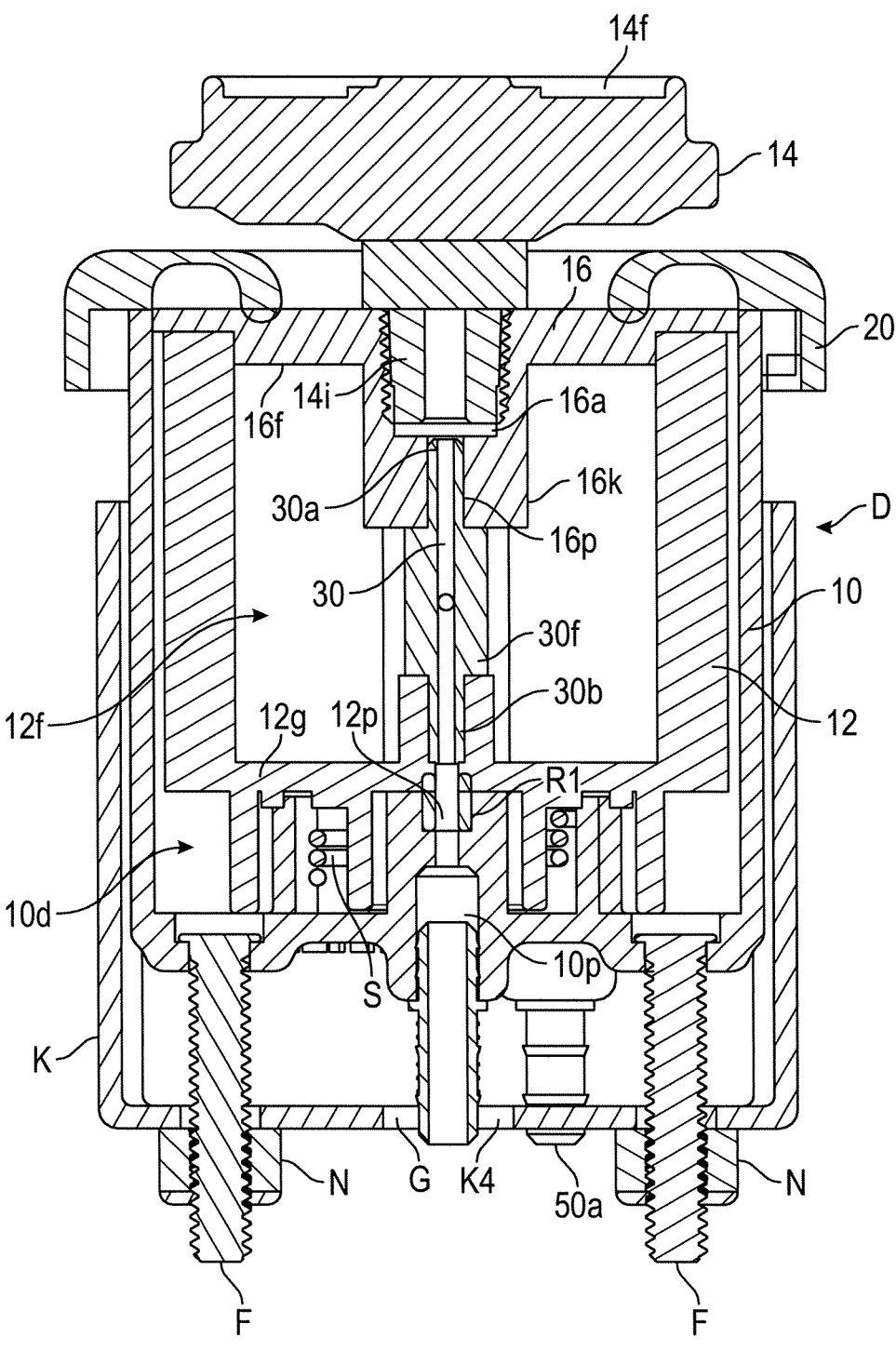
FIG. 6B is a section view of the device as taken at B-B of FIG. 6.

With brief reference to FIGS. 6A & 6B, the gauge plate 16 comprises a gauge air inlet passage 16*p* that extends between the gauge plate aperture 16*a* and an inner face 16*f* of the gauge plate 16 such that the gauge inlet passage 16*p* extends through the gauge plate 16. In the illustrated embodiment, the inner face 16*f* of the gauge plate 16 comprises a projecting boss 16*k* that projects inwardly into the secondary bore 12*f* toward the end wall 12*g* of the second body 12, and the gauge inlet passage 16*p* extends from the gauge plate aperture 16*a* through the boss 16*k* and opens through the inner face 16*f*.

Referring again to FIGS. 1-3, the pneumatic gauge and pressure control device D includes an annular bezel 20 that can be selectively connected to the first or outer body 10 by a bezel mount or bayonet mount 22 as shown or that is press-fit, adhesively secured, threadably secured, fastened, or otherwise selectively secured or connected to the first body 10 to capture the second/inner body 12 axially to the first body 10 such as in the bore 10*d* of the first body 10 while still allowing relative rotation between the second body 12 and first body 10.

The illustrated embodiment of the pneumatic gauge and pressure control device D includes one or more optional mounting fasteners F (two are shown) that extend through the inner end wall 10*e* of the first or outer body 10 and project outwardly therefrom away from the end wall 10*e*. The or each fastener F can be insert molded, press-fit or otherwise non-rotatably and fixedly secured to the end wall 10*e* and can be threaded to receive an associated nut N (see e.g., FIGS. 1 and 6B) that can be used to mount the main/outer body 10 to a vehicle dashboard, console, trailer frame, machine chassis, or any other suitable mounting structure or location. In the illustrated example, the device D further comprises an optional mounting bracket K (not shown in FIG. 2) comprising an annular collar K1 that slidably receives the first/outer body 10 and comprises a base K2 connected to the collar and including fastener apertures K3 through which the mounting fasteners F extend. The base K2 can optionally include one or more additional apertures K4 to accommodate passage of a pneumatic fitting or hose as described below.

Referring now particularly to FIG. 6A, the first/outer body 10 can comprise a cylindrical stud or boss 10*k* that is formed as part of or otherwise connected to the end wall 10*e* and that projects into the main bore 10*d* and that includes a cylindrical or conical outer surface. The boss 10*k* is coaxially positioned about the axis of rotation X so as to be centrally located in the main bore 10*d*. The inner wall 12*g* of the second/inner body 12 includes a mating bore or cup-shaped receiver 12*k* with a cylindrical or conical inner surface that corresponds with the outer surface of the boss 10*k* and that rotatably receives the boss 10*k* of the outer body 10 such that the boss 10*k* is positioned in the receiver 12*k* to position and rotatably support the inner body 12 coaxially on the axis of rotation X for rotation relative to the outer body 10.

Device D preferably comprise a spring S operably engaged between the first or outer body 10 and the second or inner body 12 to bias the second or inner body member 12 toward its first or neutral position. In the illustrated embodiment, the spring S resiliently biases the second/inner body 12 toward a first or neutral position (FIGS. 6, 6A, 6B) as described in detail below, and the spring S allows the second/inner body 12 to be manually rotated about the axis of rotation X from the first or neutral position: (i) in a first direction toward and into a second or fill position (FIGS. 7, 7A, 7B); and (ii) in a second direction opposite the first direction toward and into a third or vent position (FIGS. 8, 8A, 8B). In the illustrated example, the first direction is clockwise and the second direction is counter-clockwise, but this arrangement can be reversed without departing from the scope and intent of the present development. Also, in an alternative embodiment, the second (fill) and third (vent) positions can both be obtained by rotating the second/inner body 12 only in the first direction by different angular distances to reach the respective second (fill) and third (vent) positions from the first (neutral position), in which case the spring S biases the second/inner body 12 in an opposite second direction toward and into the first (neutral) position. In the illustrated example, spring S is a torsion spring with first and second outwardly turned or radial ends S1, S2 (FIG. 3). The spring S is positioned about the receiver 12*k* of the second/inner body adjacent the wall 12*g*. The ends S1, S2 of the spring S respectively engage first and second spring stops 12*m*, 12*n* of the second (inner) body 12 as shown in FIG. 4C. The first and second spring stops 12*m*, 12*n* (see also FIG. 4C) are provided respectively by opposite first and second ends of an arcuate wall segment 12*w* that projects outwardly from the end wall 12*g* in a position that is concentric with the receiver 12*k*. The first/outer body 10 comprises first and second arcuate tabs T1, T2 (FIG. 4A)

that project from the end wall 10e into the main bore. When the second (inner) body 12 is operatively installed in the main bore 10d of the first (outer) body 10 as described, these first and second arcuate tabs T1, T2 are slidably received between the first and second spring stops 12m, 12n and the receiver 12k. Accordingly, when the second/inner body 12 is rotated in the first direction from the first (neutral) position toward the second (fill) position, the spring ends S1, S2 become resiliently engaged between the first spring stop 12m and the second tab T2 such that the second (inner) body 12 is biased in the opposite (second) direction back toward the first (neutral) position. Conversely, when the inner body 12 is rotated in the opposite, second direction from the first (neutral) position toward the third (vent) position, the spring ends S1, S2 become resiliently engaged between the second spring stop 12n and the first tab T1 such that the second (inner) body 12 is biased in the opposite (first) direction back toward the first (neutral) position.

The device D comprises an air system fitting G that can be a straight barb fitting or any other suitable pneumatic fitting that is adapted to be connected to a pneumatic system V (see FIGS. 5A-5C) that is associated with or that includes the device D. In one non-limiting embodiment, the pneumatic system V includes one or more air springs VS, tires, or other devices or locations that receive and retain compressed air. The air system fitting G is also fluidically connected to the inlet fitting 14i of the air pressure gauge 14 such that the air pressure gauge display 14f will display or otherwise indicate the magnitude or other indication of the level or degree of air pressure present in or at the air system fitting G. In the illustrated embodiment, the air system fitting G is connected to the end wall 10e of the first (outer) body 10 and can be connected to and fluidically connected with a first or main or primary air outlet passage 10p located in the end wall 10e. As shown in FIG. 6A, the primary air outlet passage 10p can comprise an outer portion that opens through an external surface of the end wall 10e and in which the system fitting G is located and an inner portion that extends inwardly through the end wall 10e into the main bore 10 of the first body 10. In the illustrated example, the air outlet passage 10p is aligned with the axis of rotation X and extends coaxially through the boss 10k and is aligned or registered with a closely adjacent second or secondary air outlet passage 12p such as an orifice located in the end wall 12g of the second (inner) body 12. An O-ring or other seal R1 sealingly connects the primary and secondary air outlet passages 10p, 12p to block or at least inhibit escape of pressurized air while allowing relative rotation therebetween about the axis of rotation X.

Device D comprises a main airflow passage 30 that extends between the second (inner) body 12 and the gauge plate 16. More particularly, the main airflow passage 30 extends between the secondary air outlet passage 12p and the gauge inlet passage 16p and fluidically connects the secondary air outlet passage 12p (and also the primary air outlet passage 10p) to the gauge inlet passage 16p such that the pressure gauge inlet fitting 14i is in fluid communication with the secondary air outlet passage 12p and the primary air outlet passage 10p through the main airflow passage 30 so that the air pressure gauge 14 can directly sense air pressure in the primary and secondary air outlet passages 10p, 12p and the main passage 30. The air pressure gauge 14 indicates or outputs the magnitude or other indication of the sensed pressure on the pressure gauge face 14f. The main airflow passage 30 can be provided by one or more conduits, tubes, passages, orifices, and/or one or more metal or polymeric fittings such as the main fitting 30f shown herein which can be a barb tee fitting as detailed below or another fitting. In the illustrated embodiment, the main fitting comprises first and second connection ports 30a, 30b respectively fluidically connected to the gauge inlet passage 16p and the secondary air outlet passage 12p to fluidically connect same.

The main airflow passage 30 is also fluidically connected to an airflow branch passage or distribution passage 40 (FIG. 6A) that extends between a first end connected to the main airflow passage 30 and a second end connected to a distribution orifice 12x (see also FIGS. 46,4C) that extends through the inner wall 12g of the second (inner) body 12 such that the distribution orifice 12x is in fluid communication with the main airflow passage 30 through the distribution passage 40. A straight barb or other distribution fitting 12y can be engaged with the distribution orifice 12x and fluidically connected thereto. In one example, the branch or distribution passage 40 comprises a pipe, hose, conduit, and/or one or more fittings fluidically connected to the distribution fitting 12y at one end and that is fluidically connected at its opposite end to the main airflow passage 30 such as by the main fitting 30f so that the branch/distribution passage 40 and the distribution orifice 12x are fluidically connected to the main airflow passage 30. In one example, the main fitting 30f can be a barb "tee" fitting as shown herein including the first and second connection ports 30a, 30b connected directly or indirectly respectively to the gauge inlet passage 16p and the secondary air outlet passage 12p, and further including a third connection 30c that is fluidically connected to the first end of the branch/distribution passage 40. In another example, the main fitting 30f comprises a unitary or one-piece fitting structure that is connected between the second (inner) body 12 and the gauge plate 16 and that includes both the main airflow passage 30 that fluidically connects the secondary air outlet passage 12p with the gauge inlet passage 16p and that also includes the branch distribution passage 40 that fluidically connects the main airflow passage 30 to the distribution orifice 12x.

As described below in relation to FIGS. 13-18, the main fitting 30f can comprise both the main airflow passage 30 and also the branch distribution passage 40 as shown for the alternative main fitting 130f comprising both a main airflow passage 130 (corresponding to the main airflow passage 30 of the main fitting 30f) and a branch distribution passage 140 (corresponding to the branch distribution passage 40) in fluid communication with the main airflow passage 130. In the illustrated embodiment, the alternative main fitting 130f comprises a one-piece molded polymeric body 130fb in which the main airflow passage 130 and branch airflow passage 140 are formed. The body 130fb further comprises first and second connection ports 130a, 130b located at opposite ends of the main airflow passage 130 and corresponding respectively to the first and second connection ports 30a, 30b of the main fitting 30f.

The first or outer body 10 can further comprise an air inlet passage 50 (see FIGS. 4A, 7 & 7A) that can include an air inlet fitting 50a such as a straight barb fitting or other fitting adapted to be connected to a hose or other conduit or pathway that provides a source of compressed air, which can be a continuous, uninterrupted source of compressed air in one embodiment or which can be a selectively available or intermittent source of compressed air as disclosed below. The air inlet passage 50 extends through the first (outer) body 10 and fluidically communicates with the main bore 10d. In the illustrated example, the air inlet passage 50 extends through the inner end wall 10e. A seal such as an O-ring seal R2 can be located in or otherwise adjacent the air inlet passage 50 where the air inlet passage 50 opens into the main bore 10*d* and sealingly engages the inner end wall 12*g* of the second (inner) body 12.

The first or outer body 10 also comprises a vent passage 60 (see FIGS. 4A, 8 & 8A) that extends through the first (outer) body 10 and fluidically communicates with the main bore 10*d* and with an external ambient atmosphere outside of the main bore 10*d* and surrounding the outer body 10. In the illustrated example, the vent passage 60 extends through the inner end wall 10*e* at a location that is spaced from the air inlet passage 50. In the illustrated example, the air inlet passage 50 and the vent passage 60 are both located on a single arc C centered at the axis of rotation X as can be seen in FIG. 4A. A seal such as an O-ring seal R3 can be located in or otherwise adjacent the vent passage 60 where the vent passage 60 opens into the main bore 10*d* and sealingly engages the inner end wall 12*g* of the second (inner) body 12.

The device D further comprises an airflow stop AS (FIGS. 4A, 6A, 7B) provided by a surface or structure that blocks the flow of compressed air from the distribution passage 40 and distribution orifice 12*x* when the device D is in the first or neutral position as further described below. In the illustrated example, the airflow stop comprises a blind bore 70 located in the inner end wall 10*e* of the first (outer) body 10 and that opens into the main bore 10*d* but that does not extend through the inner end wall 10*e*. A seal such as an O-ring seal R4 can be located adjacent the airflow stop/blind bore 70 where the airflow stop/blind bore 70 opens into the main bore 10*d* and sealingly engages the inner end wall 12*g* of the second (inner) body 12. As shown in the alternative embodiment D2 of FIGS. 14A & 14B, the seals R2, R3, R4 can be combined into a single one-piece seal element that is operatively installed onto the first body 10/110.

In the illustrated example, as best seen in FIG. 4A, the air inlet passage 50, vent passage 60, and the blind bore 70 or other airflow stop AS are all located in an airflow block or manifold M that is defined as part of or is connected to the first (outer) body 10. More particularly, in the presently illustrated embodiment of the main body 10, the manifold M is defined as part of a one-piece construction with the remainder of the first body 10 and is connected to an inner face of the inner end wall 10*e* that is oriented toward the main bore 10*d* so that the manifold extends into and is accessible within the main bore 10*d*. The illustrated embodiment also shows that the blind bore 70 or other airflow stop AS can be located between the air inlet passage 50 and vent passage 60, also located on the single or common arc C centered at the axis of rotation X. Alternatively, the air inlet passage 50 and vent passage 60 are located adjacent each other (circumferentially successive with respect to each other) on the common arc C, with one of the air inlet passage 50 and vent passage 60 being located circumferentially between the blind bore 70 (airflow stop AS) and the other one of the air inlet passage 50 and vent passage 60.

Figure 5A:
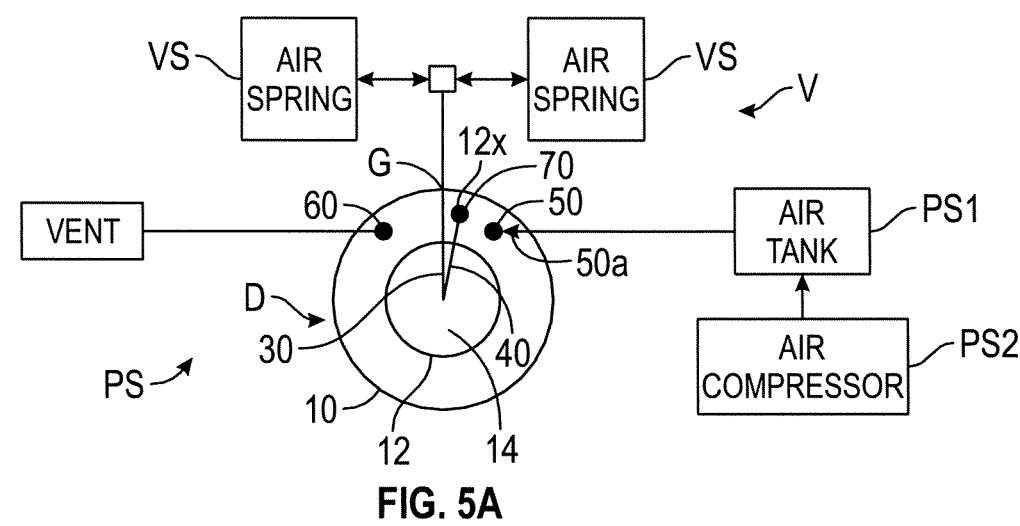
FIG. 5A is a schematic diagram of an embodiment of a pneumatic system including the gauge and pressure control device of FIG. 1, with the pneumatic gauge and pressure control device arranged or configured in a first or neutral operative position to maintain pneumatic pressure in the system.
Figure 5B:
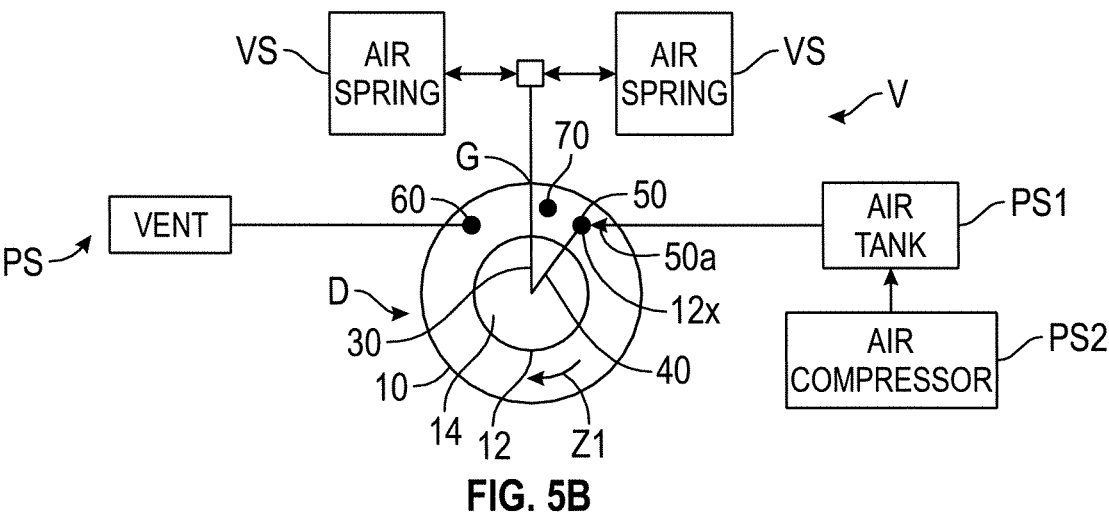
FIG. 5B is similar to FIG. 5A but shows the pneumatic gauge and pressure control device arranged or configured in a second or fill operative position to fill or add compressed air to the system.
Figure 5C:
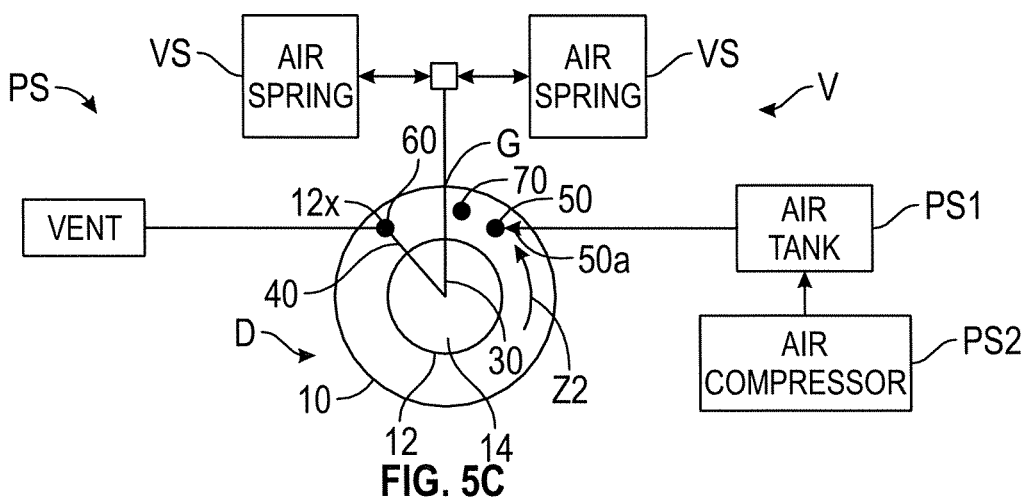
FIG. 5C is similar to FIG. 5A but shows the pneumatic gauge and pressure control device arranged or configured in a third or vent operative position to vent compressed air from the system.

As shown in FIGS. 5A-5C, the device D is adapted to be connected to and be a part of a pneumatic system PS. The pneumatic system PS comprises a compressed air source such as an air tank PS1 that can be intermittently fed by an air compressor PS2 or another source or supply. The tank PS1 and air compressor PS2 can be separate physical components or can alternatively be physically integrated into a single system to provide a source of compressed air. The compressed air source such as the tank PS1 is fluidically connected by a hose or other conduit or otherwise fluidically connected to the air inlet fitting 50*a* and air inlet passage 50 of the device D. The pneumatic system PS can include a destination device or system V (or subsystem V) that is adapted to receive and receives compressed air from the tank PS1 or other source as controlled by the pneumatic gauge and pressure control device D or an alternative embodiment provided in accordance with another embodiment of the present development as described below. The destination device or system V is fluidically connected by a hose or other conduit to the air system fitting G and primary air outlet passage 10*p* of the device D such that the destination device or system V is also fluidically connected to the main airflow passage 30 through the secondary air outlet passage 12*p* which communicates with the primary air outlet passage as described above. In the illustrated example, the destination system V comprises at least one and typically two or more vehicle air springs VS such as commercial vehicle (truck) or passenger vehicle air springs VS as used for suspension components, ride-height control, cab shock-absorption, and other applications. The example of a pneumatic system PS as shown herein is not intended to limit the present development D in any way and those of ordinary skill in the art will recognize that the pneumatic system in which or in association with which the present device D is used can vary greatly without departing from the scope and intent of the present development.

FIG. 5A and FIGS. 6-6B show the device D in its first or neutral state or configuration in which the second (inner) body 12 is located in a first or neutral position where the distribution orifice 12*x* is aligned with and engaged with the airflow stop AS such as the blind bore 70 such that flow of compressed air into or out of the distribution orifice 12*x* and distribution passage 40 is blocked. As shown in FIG. 6A, the O-ring seal R4 sealingly engages the manifold M of the first (outer) body 10 with the inner end wall 12*g* of the second (inner) body 12 surrounding the distribution orifice 12*x* to block or at least substantially impede the escape of compressed air from the distribution passage 40 through the distribution orifice 12*x*. The second (inner) body 12 can be continuously urged into this first or neutral position by the spring S. In this first or neutral position, the air pressure gauge 14 senses the air pressure in the air spring(s) VS or other destination system V by way of the main airflow passage 30 that is in communication with the gauge inlet fitting 14*i* as described above.

Figure 7:
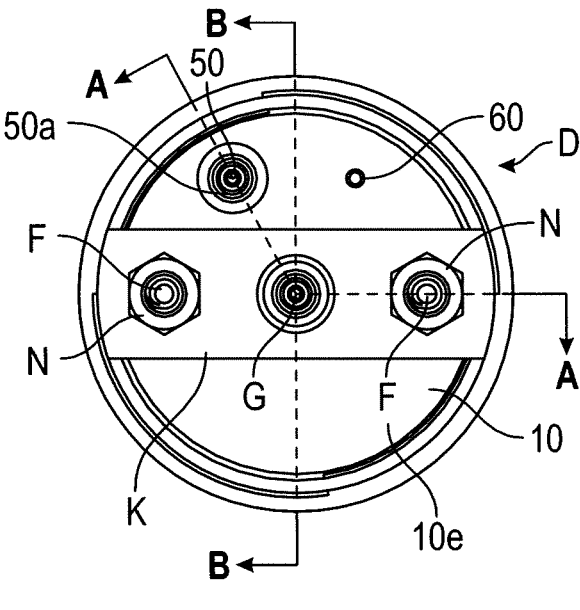
FIG. 7 is a rear view of the gauge and pressure control device of FIG. 1, with the device in its second/fill position corresponding to FIG. 5B.
Figure 7A:
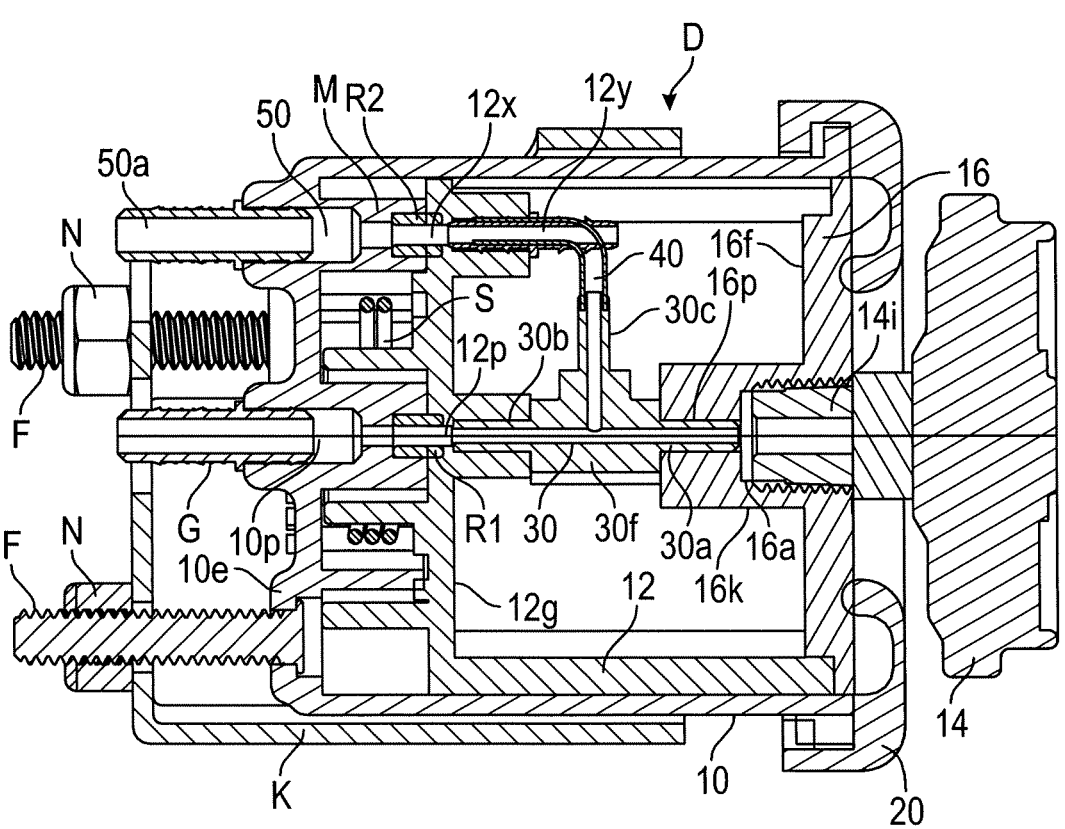
FIG. 7A is a section view of the device as taken at A-A of FIG. 7.
Figure 7B:
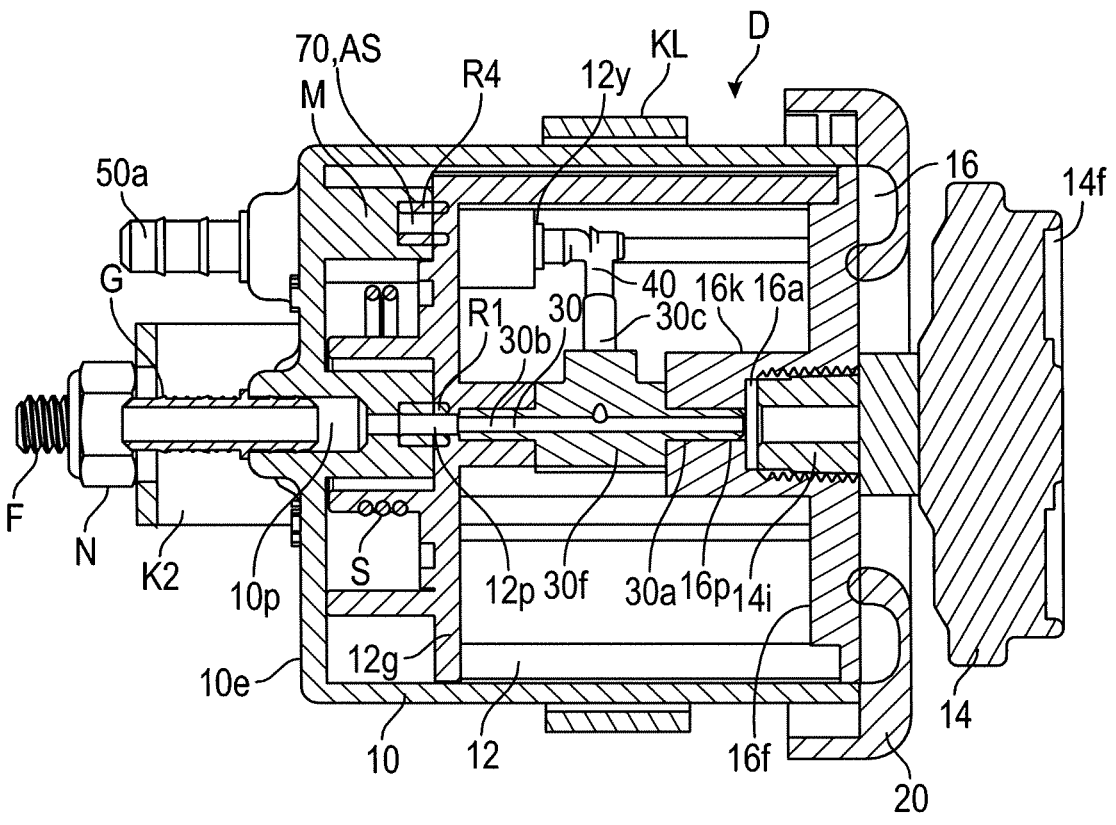
FIG. 7B is a section view of the device as taken at B-B of FIG. 7.
Figure 8:
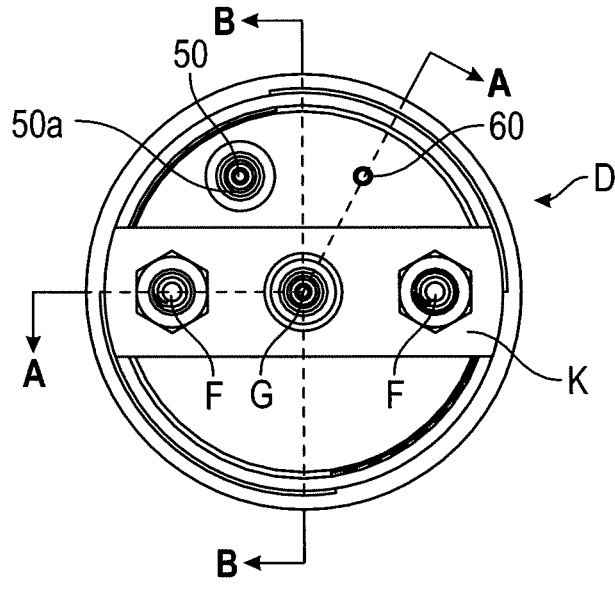
FIG. 8 is a rear view of the gauge and pressure control device of FIG. 1, with the device in its third/vent operative position corresponding to FIG. 5C.
Figure 8A:
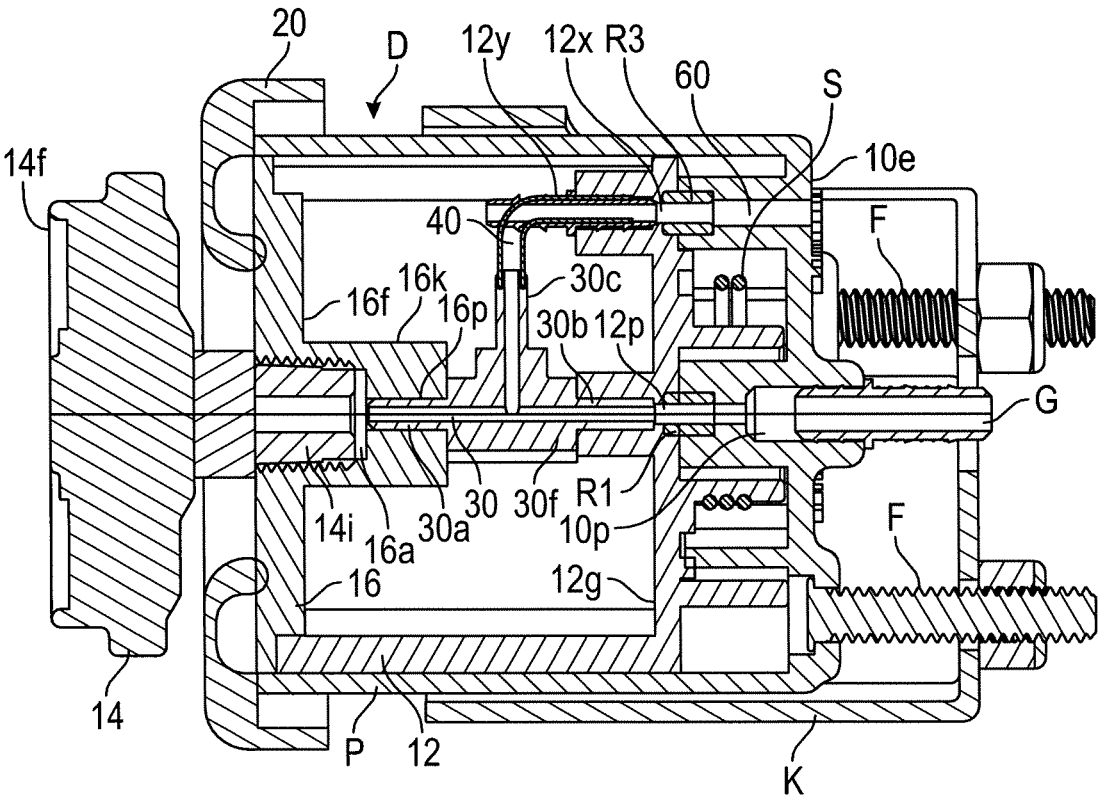
FIG. 8A is a section view of the device as taken at A-A of FIG. 8.
Figure 8B:
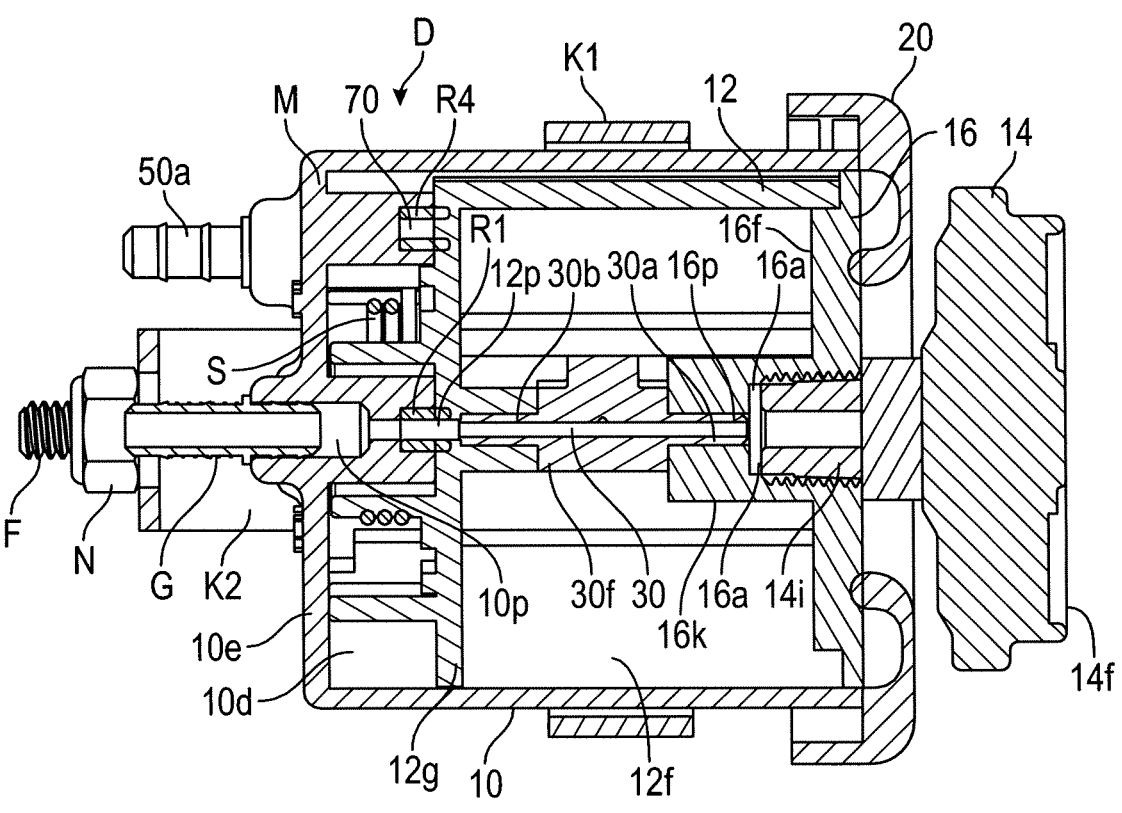
FIG. 8B is a section view of the device as taken at B-B of FIG. 8.

FIG. 5B and FIGS. 7-7B show the device D in its second or fill state or configuration in which the second (inner) body 12 is manually rotated by application to rotational force on the pressure gauge 14 or on the second (inner) body 12 about the axis of rotation X against the biasing force of the spring S in a first direction Z1 in the illustrated embodiment so as to be located in a second or fill position where the distribution orifice 12*x* is aligned or registered with and engaged with the air inlet passage 50 such that compressed air from the tank or other source PS1 flows from the air inlet passage 50 into the distribution orifice 12*x* and from there into the distribution passage 40 and also into the main airflow passage 30 such that the compressed air from the source PS1 received into the air inlet passage 50 is communicated to the air spring(s) VS or other destination system V by way of the air secondary and primary air outlet passages 12*p*, 10*p* and system fitting G. When manual rotational force is removed from pressure gauge 14 and/or second (inner) body 12, the spring S resiliently returns the second (inner) body 12 to the first/neutral position.

FIG. 5C and FIGS. 8-8B show the device D in its third or vent state or configuration in which the second (inner) body 12 is manually rotated by application to rotational force on the pressure gauge 14 or on the second (inner) body 12 about the axis of rotation X against the biasing force of the spring S in a second direction Z2 which is opposite the first direction Z1 in the illustrated embodiment. The second (inner) body 12 is located in a third or vent position where the distribution orifice 12x is aligned or registered with and engaged with the vent passage 60 of the main (outer) body 10 such that compressed air from the air spring(s) VS or other destination system V flows outwardly through the vent passage 60 by way of the primary and secondary air outlet passages 10p, 12p, the main airflow passage 30, the distribution passage 40, and the distribution orifice 12x which is aligned with the vent passage 60. When manual rotational force is removed from pressure gauge 14 and/or second (inner) body 12, the spring S resiliently returns the second (inner) body 12 to the first/neutral position.

In an alternative embodiment, the arrangement of the air inlet passage 50, vent passage 60, and blind bore 70 or other air stop AS is modified such that the inner body 12 is rotated in only a single direction (the first direction Z1 or the second direction Z2) from the first or neutral state or position of FIG. 5A to reach both the second (fill) state or position and the third (vent) state of FIG. 5C. In such case, the second (fill) state/position and the third (vent) state/position can be arranged in any desired position relative to each other with the second (fill) state/position being located circumferentially between the first (neutral) position and the third (vent) state or with the third (vent) position being located circumferentially between the first (neutral) position and the second (fill) state. In one such example, the air inlet passage 50 and vent passage 60 are located adjacent each other (circumferentially successive with respect to each other) on the common arc C, with one of the air inlet passage 50 and vent passage 60 being located circumferentially between the blind bore 70 (airflow stop AS) and the other one of the air inlet passage 50 and vent passage 60.

Figures 9A, 9B, 9C:
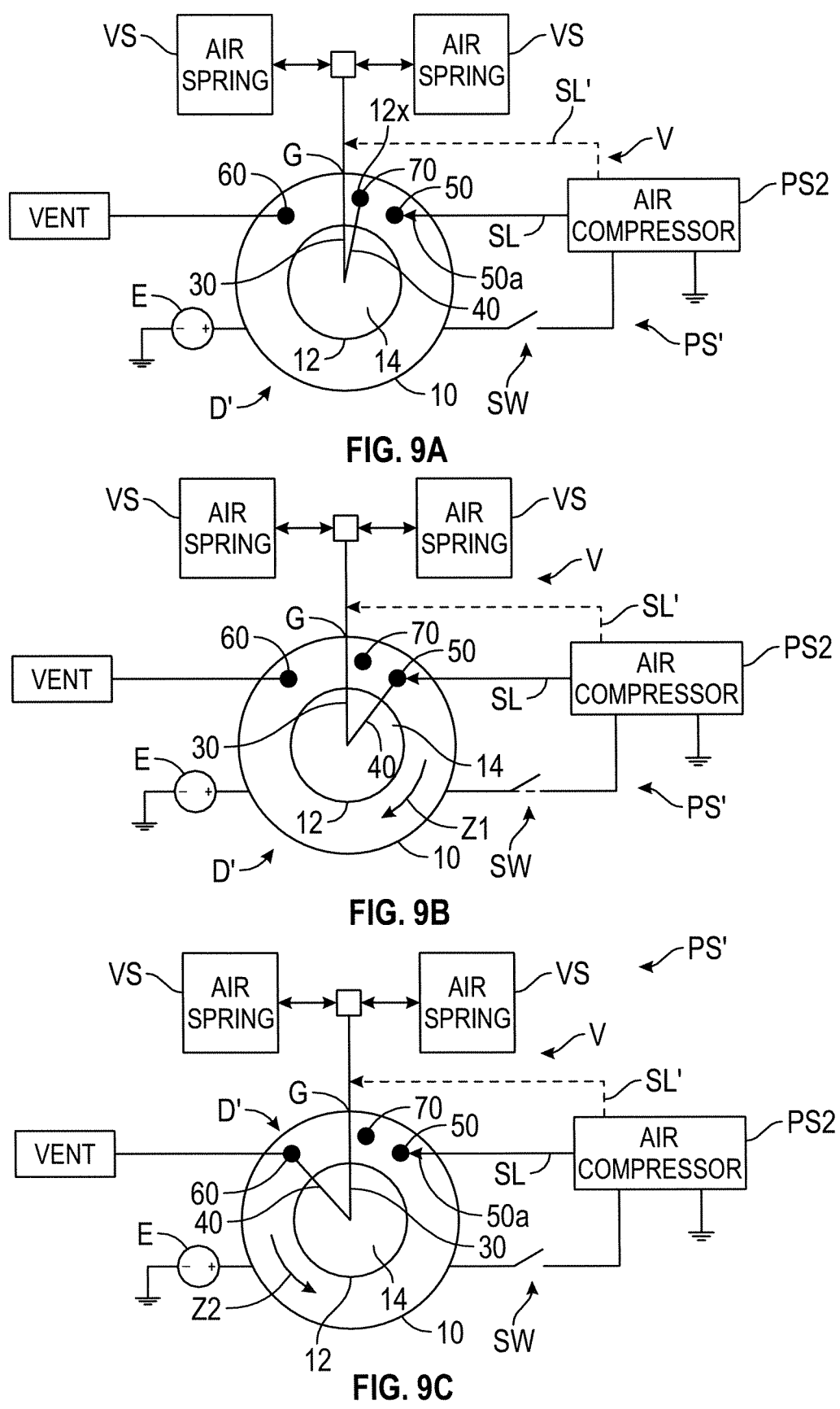
FIGS. 9A-9C correspond respectively to FIGS. 5A-5C but show an alternative pneumatic system pneumatic system including an alternative pneumatic gauge and pressure control device.

FIGS. 9A-9C correspond respectively to FIGS. 5A-5C but show an alternative pneumatic system PS' that is identical to the pneumatic system PS except as otherwise shown and/or described herein. In the system PS', the air tank PS1 has been eliminated such that the compressed air supply system comprises an air compressor PS2 having a compressed air outlet directly connected to the air inlet fitting 50a and air inlet passage 50 by an air supply line SL which can be provided by any one or more passages, hoses, conduits, or other air flow paths. The pneumatic gauge and pressure control device D of FIGS. 5A-5B has been replaced by a pneumatic gauge and pressure control device D' that is identical to the device D except that it is operably connected to a source of electrical power E which can be DC or AC power and comprises one or more mechanical or solid state (semiconductor) switches SW (i.e., a single switch SW or more than one switch SW) that selectively control operative connection of the electrical power E to the air compressor PS2. The one or more switches SW can be located within the main bore 10d of the first body 10 and, in such case the first body 10 can includes one or more optional metallic electrical terminals TX molded into, assembled to, or otherwise connected to the first body 10 and accessible externally of main bore 10d outside of the main body 10 for connection of electrical wires thereto (see e.g., the optional terminals TX shown in FIG. 12). The electrical terminals TX can be operatively electrically connected to the switch(es) SW located in the main bore 10d. With respect to the device D', when the pneumatic gauge and pressure control device D' is in its second (fill) state, the one or more switches SW operably connect the electrical power E to the air compressor PS2 (shown with a broken line at the switch SW in FIG. 9B) such that the air compressor PS2 operates to supply compressed air to the air inlet passage 50 via air inlet fitting 50a through the supply line SL. In the first (neutral) and third (vent) operative positions of the pneumatic gauge and pressure control device D', the one or more switches SW open or otherwise disconnect or decouple the air compressor PS2 from the operative electrical power E. Optionally, in a further alternative embodiment, the air supply line SL is replaced by an air supply line SL' (as shown in FIGS. 9A-9C with a broken line) comprising any one or more passages, hoses, conduits, or other air flow paths that bypasses the pneumatic gauge and pressure control device D' and connects the compressed air outlet of the air compressor PS2 directly to the pneumatic system V, such as to the one or more air springs VS, without flowing through the pneumatic gauge and pressure control device D'. In such case, the pneumatic gauge and pressure control device D' can be modified to eliminate the air inlet fitting 50a and air inlet passage 50. Also in such case in which the air supply line SL is replaced by the air supply line SL', when the pneumatic gauge and pressure control device D' is manipulated to be in the second (fill) state, the one or more switches SW operably connect the electrical power E to the air compressor PS2 such that the air compressor PS2 operates to supply compressed air to the pneumatic system V through the supply line/passage SL' such as the illustrated system V including one or more air springs VS. In the first (neutral) and third (vent) operative positions of the pneumatic gauge and pressure control device D', the one or more switches SW disconnect the air compressor PS2 from the operative electrical power E or otherwise deenergize and/or deactivate the air compressor PS2.

Figure 10:
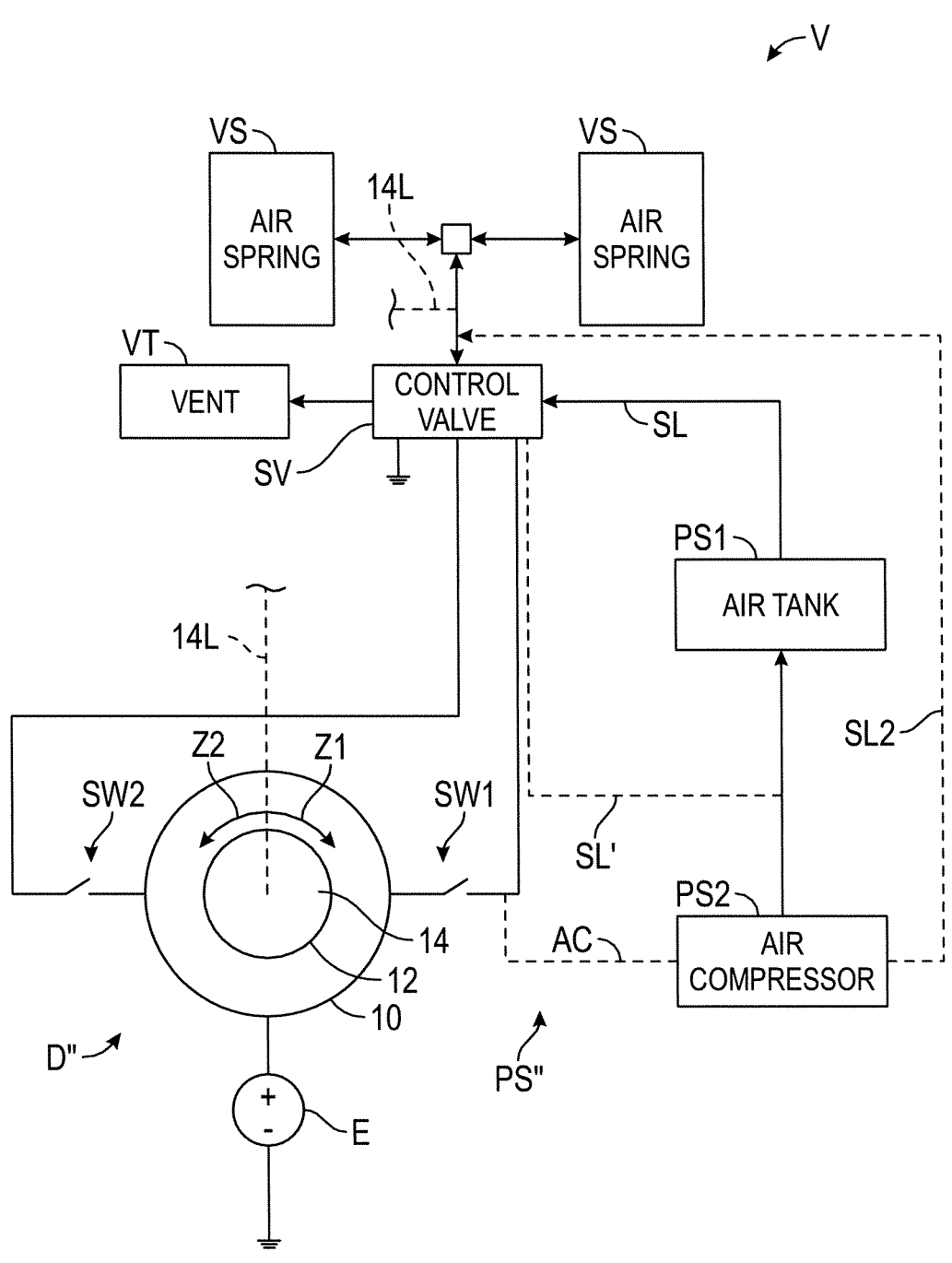
FIG. 10 illustrates a pneumatic/electric system and a pneumatic gauge and pressure control device each provided in accordance with an alternative embodiment of the present development, wherein the pneumatic gauge and pressure control device comprises one or more electrical switches (such as the illustrated two switches or more) operatively connected to a pneumatic control valve.

FIG. 10 shows another alternative pneumatic system PS" that is identical to the system PS except as otherwise shown and/or described herein. In the pneumatic system PS", the destination pneumatic device or system V such as the one or more air springs VS is fluidically connected to an electrically controlled pneumatic flow control valve SV such as a solenoid valve or other control valve. The control valve SV is also operably connected by a supply line SL to a source of compressed air such as the air tank PS1 fed by the compressor PS2 or the tank PS1 can be eliminated and the control valve SV connected directly to the compressor PS2 by the supply line SL as shown by the broken line SL'. The control valve SV can be normally spring biased to a first or neutral position in which the control valve SV blocks flow of compressed air into or out of the air springs VS or other system V. The pneumatic gauge and pressure control device D of FIGS. 5A-5B has been replaced by a pneumatic gauge and pressure control device D" that is identical to the device D except as otherwise shown and/or described herein. The pneumatic gauge and pressure control device D" can omit the air inlet passage 50, vent passage 60, airflow stop 70, distribution passage 40, and distribution orifice 12x. The pressure gauge inlet fitting 14i is fluidically connected to the destination system V as indicated by the broken line 14L such that the pressure gauge 14 can directly sense and output or provide an indication of the air pressure in the air spring(s) VS or other destination system V. The pneumatic gauge and pressure control device D" is operably connected to a source of electrical power E which can be DC or AC power and comprises one or more mechanical or solid state (semiconductor) switches SW1, SW2 that selectively control operative connection of the electrical power E to the control valve SV. When the device pneumatic gauge and pressure control device D" is in its first (neutral) position, the control valve SV can be deenergized and spring-biased to its first or neutral position in which the control valve SV blocks flow of compressed air into or out of the air spring(s) VS or other destination system V. When the pneumatic gauge and pressure control device D" is in its second (fill) state, the one or more switches SW1, SW2 operably connect the electrical power E to the control valve SV to cause the control valve to move into a second (fill) state in which the control valve SV shifts to place the air tank PS1 in fluid communication with the air spring(s) VS and/or other components of the destination system V so that compressed air is supplied to the destination system V from the tank PS1 via supply path SL. If the air tank PS1 is omitted, when the pneumatic gauge and pressure control device D" is in its second (fill) state, the one or more switches SW1, SW2 operably connect the electrical power E to the control valve SV and also to the compressor PS2 (via electrical connection AC shown with a broken lines) to both operably energize the compressor PS2 and also cause the control valve SV to shift into a second (fill) state in which the control valve SV places the compressed air outlet of the operative air compressor PS2 into fluid communication with the air spring(s) VS and/or other components of the destination system V via supply line/path SL' so that compressed air is supplied to the destination system V from the compressor PS2. When the pneumatic gauge and pressure control device D" is in its third (vent) state, the one or more switches SW1, SW2 operably connect the electrical power E to the control valve SV to cause the control valve SV to shift into a third (vent) state in which the control valve SV places the destination system V in fluid communication with a vent VT (which can be a vent orifice of the valve SV or other air outlet or vent location) so that compressed air is vented from the air spring(s) VS and/or other components of the destination system V to a surrounding atmosphere or other location. In such third (vent) state, the control valve SV blocks communication of compressed air into the system V from the air tank PS1 via path SL or from air compressor PS2 via path SL'. Also, in such third (vent) state, the one or more switches SW1, SW2 of the pneumatic gauge and pressure control device D" can deenergize the air compressor PS2.

In a further alternative embodiment, the supply line SL, SL' is replaced by a supply line SL2 as shown in broken lines in FIG. 10 that connects the compressed air outlet of the air compressor PS2 directly into fluid communication with the pneumatic system V such as the one or more air springs VS without passing through the control valve SV. In such embodiment, when the pneumatic gauge and pressure control device D" is in its second (fill) state, the one or more switches SW1, SW2 operably connect the electrical power E to or otherwise activate the air compressor PS2 (as shown by the broken line AC) to cause compressed air to be supplied from the air compressor PS2 to the air spring(s) VS and/or other components of the destination system V without passing through the control valve SV, in which case the control valve SV is used only for venting as described above.

Figure 11A:
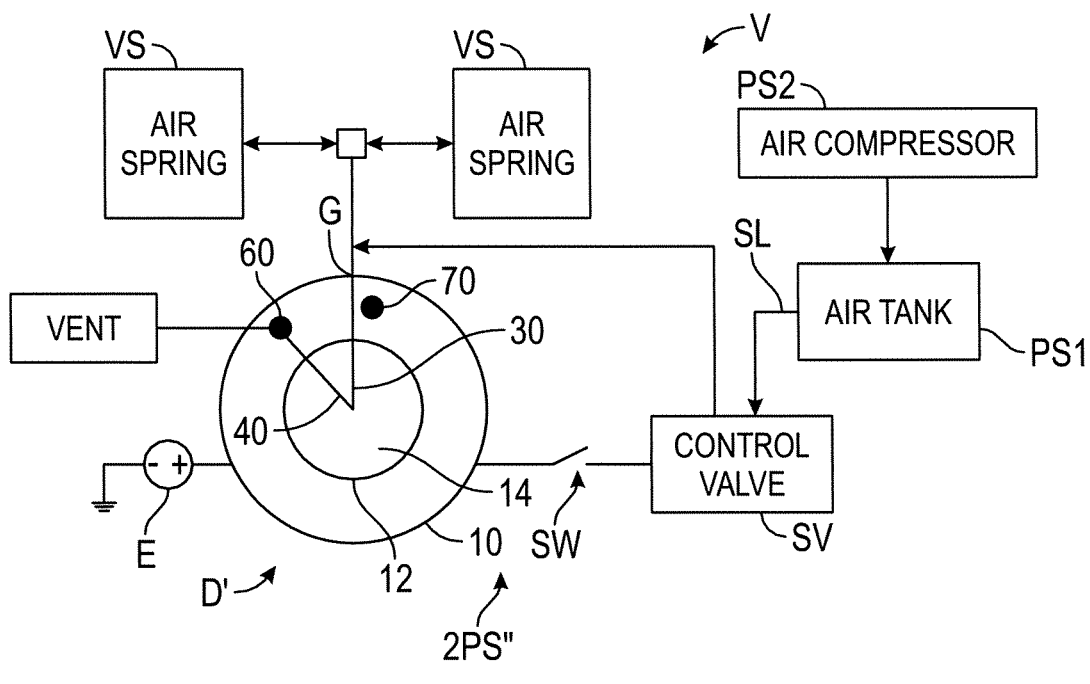
FIGS. 11A and 11B respectively show additional alternative embodiments in which the embodiments of FIG. 10 are modified to use the pneumatic gauge and pressure control device D' of FIGS. 9A-9C.
Figure 11B:
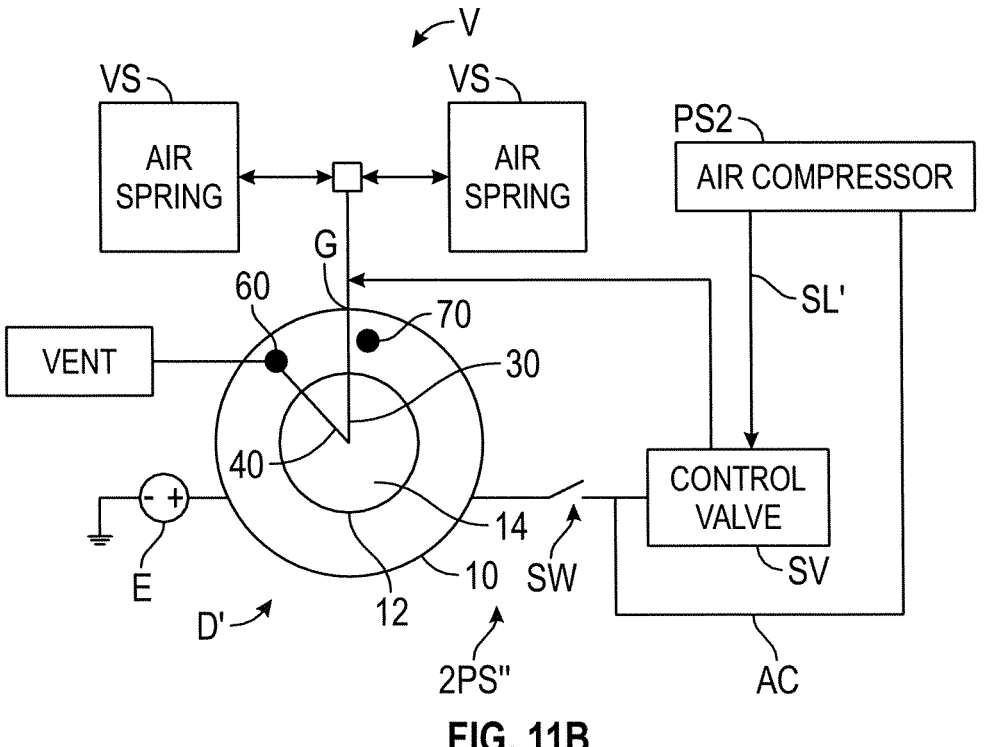

FIGS. 11A and 11B respectively show additional alternative embodiments in which the embodiments of FIG. 10 are modified to use the pneumatic gauge and pressure control device D' of FIGS. 9A— 9C such that venting of compressed air from the air springs VS or other system V is accomplished through the pneumatic gauge and pressure control device D' as described in relation to FIGS. 9A-9C. In particular, FIG. 11A corresponds to the embodiment of FIG. 10 in which the compressed air outlet of the air tank PS1 is connected to the control valve SV by way of supply line SL. The air springs V or other components of the pneumatic system 2PS" are fluidically connected to the air system fitting G of the pneumatic gauge and pressure control device D'. In this embodiment, the air inlet fitting 50a and inlet passage 50 can be eliminated. The pneumatic gauge and pressure control device D' is identical to the device D except that it is operably connected to a source of electrical power E which can be DC or AC power and comprises one or more mechanical or solid state (semiconductor) switches SW (i.e., a single switch SW or more than one switch SW) that selectively control operative connection of electrical power to the control valve SV. More particularly, when the pneumatic gauge and pressure control device D' is in its second (fill) state, the one or more switches SW operably connect the electrical power E to the control valve SV such that the control valve SV opens to allow flow of compressed air from the air tank PS1 to the air springs VS or other system V. In the first (neutral) and third (vent) operative positions of the pneumatic gauge and pressure control device D', the one or more switches SW operate to disconnect the control valve SV from the operative electrical power E or to otherwise control the control valve SV such that the control valve SV closes and blocks flow of compressed air from the air tank PS1 to the pneumatic system V. In one example, the control valve SV comprises a solenoid valve that is spring-biased to a normally closed state that blocks air flow. When the electrical power E is connected to the control valve SV, the valve SV opens against the biasing force of the spring to allow air flow. When the electronic power is disconnected from the control valve SV, the control valve SV automatically closes under the biasing force of the spring to block air flow. In the third (vent) operative position (as shown in FIG. 11A), the distribution passage 40 is fluidically connected to the vent passage 60 to vent compressed air from the system V, i.e., compressed air flows from the system V into the system fitting G, into the main passage 30, into the distribution/branch passage 40 and is vented through the vent passage/orifice 60. As described above, in relation to FIGS. 9A-9C, when the pneumatic gauge and pressure control device D' is in its first (neutral) position, the distribution passage or branch passage 40 is blocked by the blind bore or other air stop 70 to capture compressed air in the system V.

The embodiment shown in FIG. 11B is identical to the embodiment of FIG. 11A but eliminates the air tank PS1. In such case, when the pneumatic gauge and pressure control device D' is in its second (fill) state, the one or more switches SW operably connect the electrical power E to the control valve SV and also to the compressor PS2 (via electrical connection AC) to both operably energize the compressor PS2 and also cause the control valve SV to shift into a second (fill) state in which the control valve SV opens and places the compressed air outlet of the operative air compressor PS2 into fluid communication with the air spring(s) VS and/or other components of the destination system V via supply line/path SL' so that compressed air is supplied to the destination system V from the compressor PS2.

In another alternative embodiment, instead of rotating the second/inner body 12 in a first direction Z1 to obtain the second (fill) position and rotating the second/inner body 12 in an opposite second direction Z2 to obtain the third (vent) position, the second/inner body 12 can be rotated in only the first direction Z1 (or only in the second direction Z2) to obtain and be positioned in both the second (fill) position and the third (vent) position, wherein one of these positions is obtained first by rotating the second/inner body 12 a first angular distance in the first or second direction Z1, Z2 and the other of these positions is obtained by rotating the second/inner body 12 further in the same direction Z1, Z2 a second angular distance (greater than the first angular distance). In such case, the spring S biases the second/inner body 12 toward and into its first (neutral position) and allows manual rotation of the second/inner body 12 in one direction toward and into each of the second (fill) and third (vent) positions depending upon the magnitude of rotation.

Although the pneumatic gauge and pressure control device D, D', D" is described primarily as being structured such that the second body 12 rotates relative to the first body 10 to and between the first (neutral), second (fill), and third (vent) positions, in an alternative embodiment, the first body 10 can rotate relative to the second body 12 to obtain the first (neutral), second (fill), and third (vent) positions, or both the first body 10 and second body 12 can be rotated relative to each other to obtain the first (neutral), second (fill), and third (vent) positions. As such, it is the selective, relative rotational positions of the first and second bodies 10, 12, that places the device D, D', D" in its first (neutral), second (fill), and third (vent) states or positions. In another alternative embodiment, the pneumatic gauge 14 and the second body 12 slide axially along the axis X relative to the first body 10 and/or the first body 10 slides axially along the axis X relative to the second body 12 to configure or place the device D, D', D" in the first, second, and third operative states or positions. For example, in one embodiment, a user manually depressed the pneumatic gauge 14 inwardly along the axis X toward the inner end wall 10e of the first body 10 to place the device D, D', D" in its fill state to add compressed air to the system (as indicated by broken line arrow Z1' in FIG. 1) and the user manually extends or pulls the pneumatic gauge 14 away from the inner end wall 10e of the first body 10 to place the device D, D', D" in its vent state to vent compressed air from the system V (as indicated by broken line arrow Z1' in FIG. 1).

Any compressed air supply line, path, passage, conduit, or connection described herein can be provided by one or more hoses, passages, orifices, conduits, fittings, valves, manifolds, and other compressed air supply or flow control components that communicate compressed air from a source or region of higher pressure to a destination or region of lower pressure.

Figure 12:
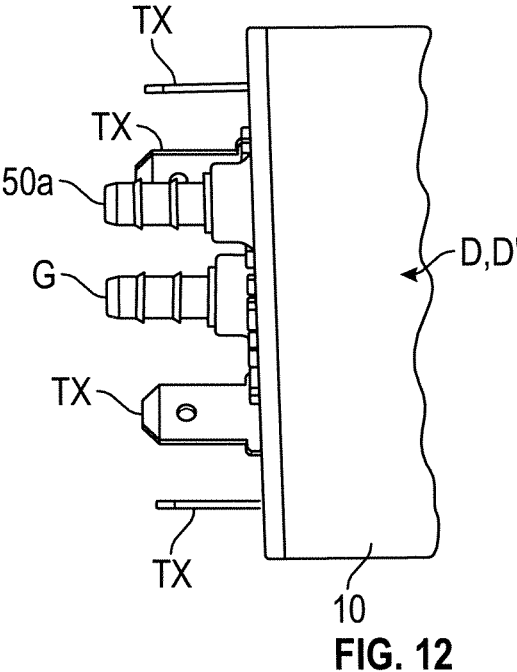
FIG. 12 partially illustrates a pneumatic gauge and pressure control device according to embodiments of the present development wherein the first body comprises one or more optional electrical terminals.

FIG. 12 partially illustrates a pneumatic gauge and pressure control device D', D" wherein the first body 10 further comprises one or more optional electrical terminals TX projecting outwardly through the end wall 10e and adapted to be connected to electrical wires. The terminals TX are electrically operably connected to the one or more electrical switches located inside the main bore 10d of the first housing 10.

FIGS. 13-17 illustrate another alternative embodiment of a pneumatic gauge and pressure control device D2 which is identical to the pneumatic gauge and pressure control device D and D' except as otherwise shown and/or described herein. In FIGS. 13-17, the pneumatic gauge and pressure control device D2 is shown with the optional electrical terminals TX that can be included when the pneumatic gauge and pressure control device D2 is provided with one or more electrical switches SW as described in relation to the pneumatic gauge and pressure control device D' and that can be omitted when the pneumatic gauge and pressure control device D2 does not include any electrical switched SW such as when the pneumatic gauge and pressure control device D2 is arranged as described in relation to the pneumatic gauge and pressure control device D. Like components relative to the devices D, D' are identified with like reference numbers/letters and are not necessarily described again, while similar corresponding components are identified with reference numbers that are 100 greater than those used to describe the devices D, D' and any differences relative to the devices D, D' are shown and/or described as required to understand the alternative embodiment D2 of the device.

The first (outer) body 110 of device D2 includes external helical threads 110t. The bezel 120 is connected to the first body 110 by being threadably engaged with the external threads 110t. The external threads 110t which can be continuous or include separate spaced-apart sections, are also adapted to threadably receive a corresponding mounting nut 110n that is used to connect the device D2 to an associated panel P (FIG. 13) or other mounting structure by inserting the first body 110 through and aperture defined in the panel P and advancing the mounting nut 110n on the external threads 110t to capture the panel P between the bezel 120 and the mounting nut 110n. The nut 110n can include flats or be scalloped (as shown) or otherwise include a non-circular peripheral edge 110n1 to facilitate manual rotation of the nut 110n on the threads 110t by a user.

Figure 13:
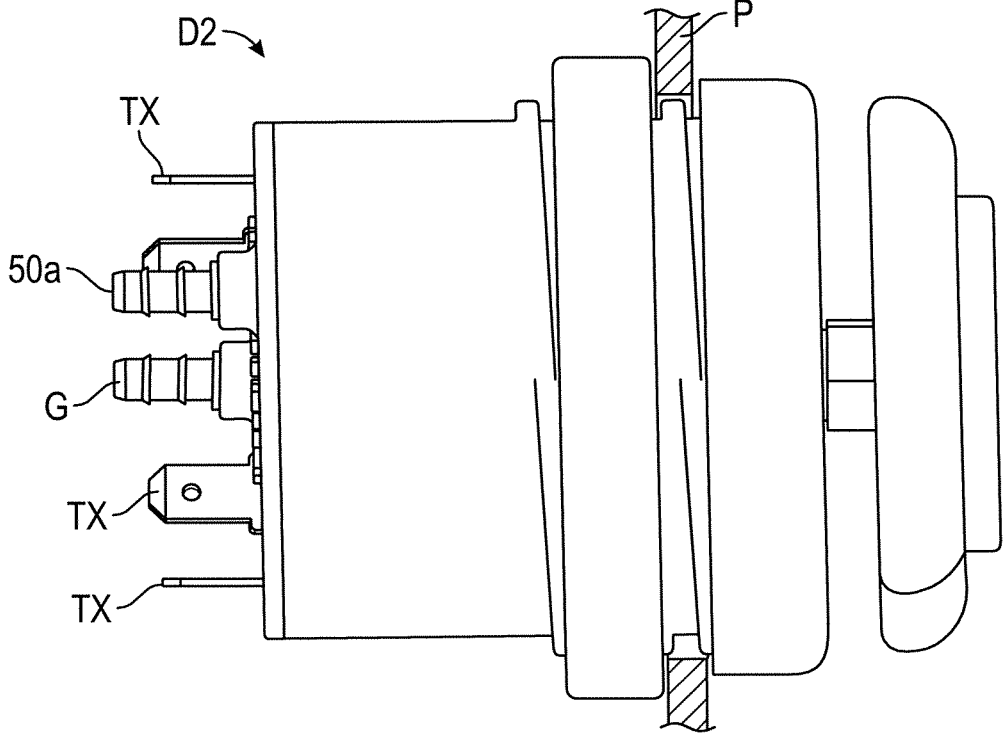
FIG. 13 is a side view that illustrates another alternative embodiment of a pneumatic gauge and pressure control device according to an embodiment of the present development.
Figure 14A:
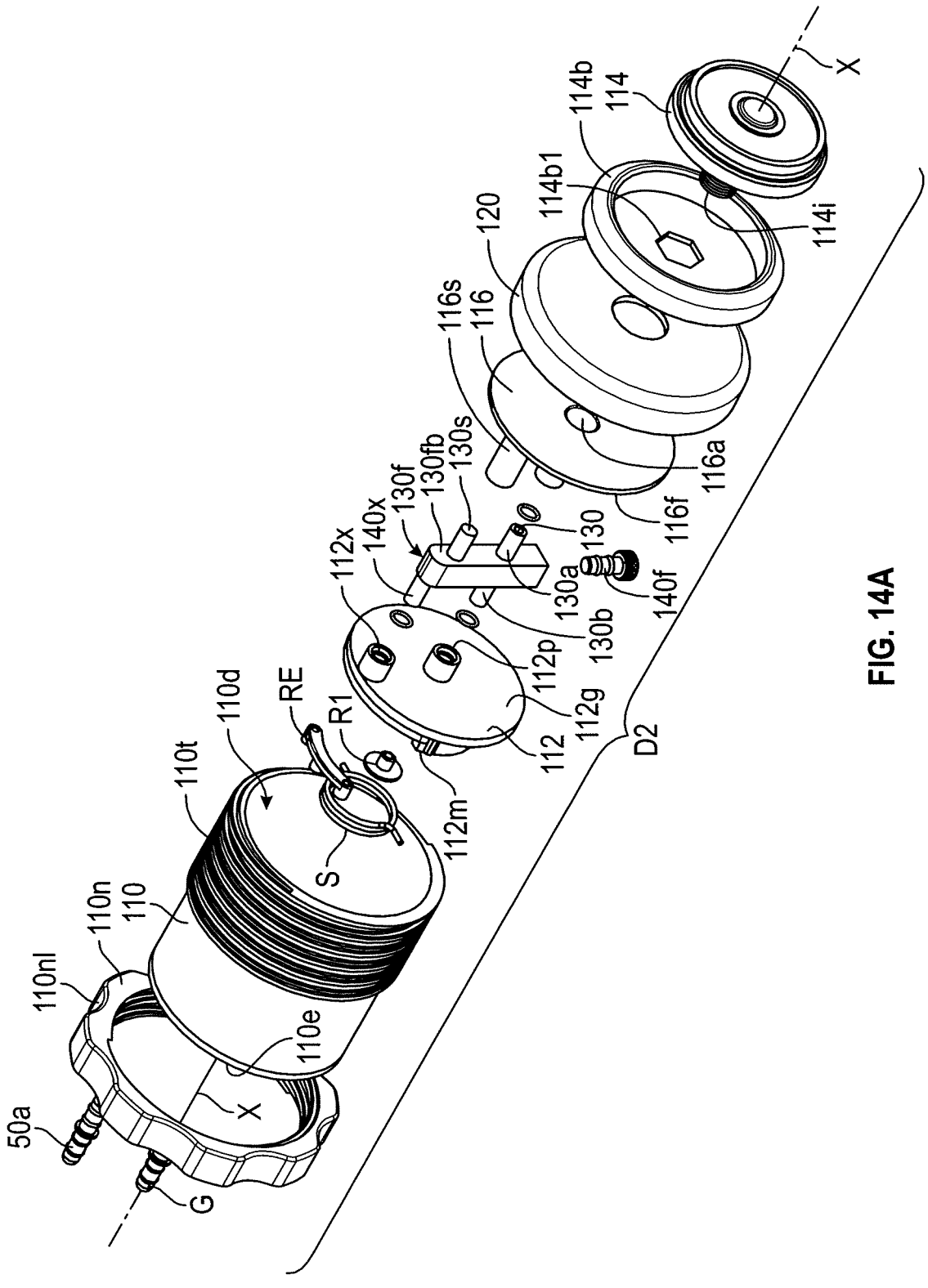
FIGS. 14A & 14B are respective front and rear exploded isometric views of the device of FIG. 13.
Figure 14B:
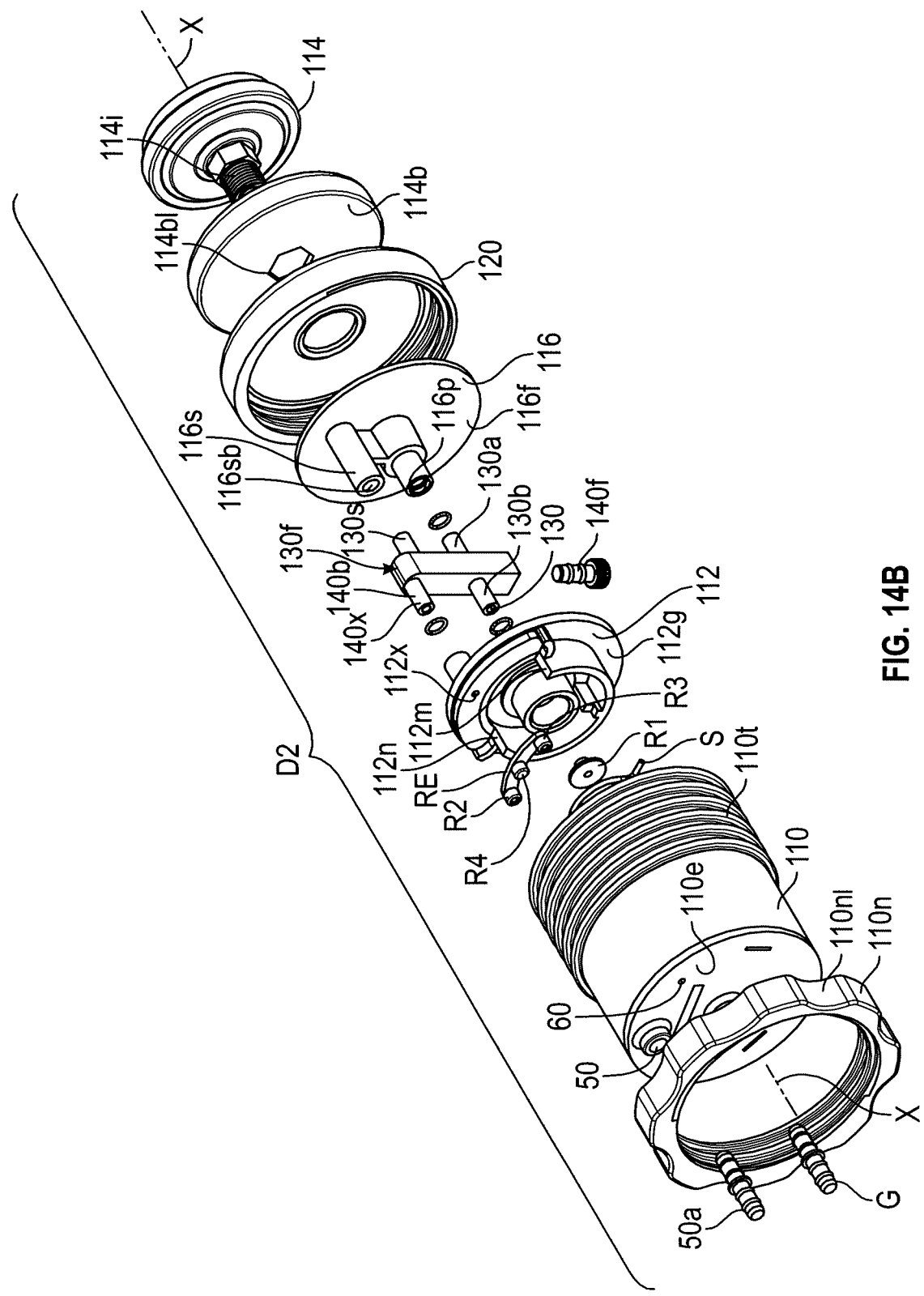
Figure 15:
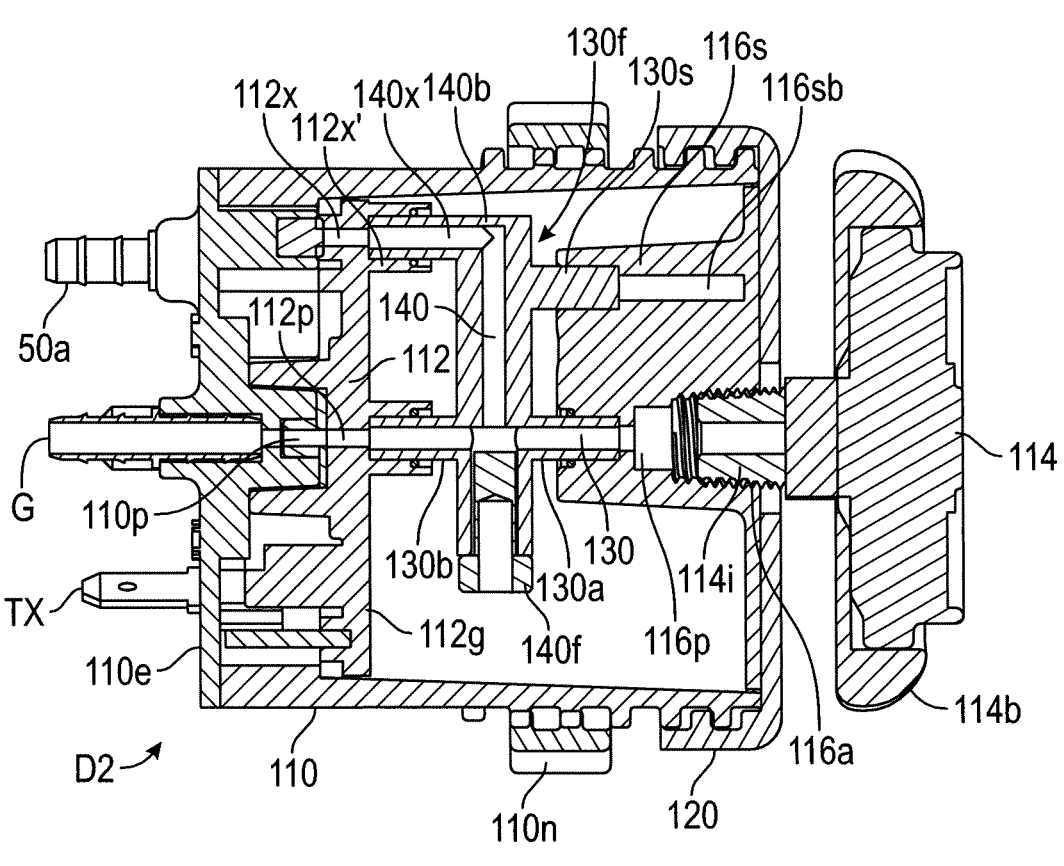
FIGS. 15, 16, & 17 are section views of the device of FIG. 13 that respectively show the device in its neutral, fill, and vent operative states; and, FIG. 18 is a section view of the main fitting of the device of FIG. 13.
Figure 16:
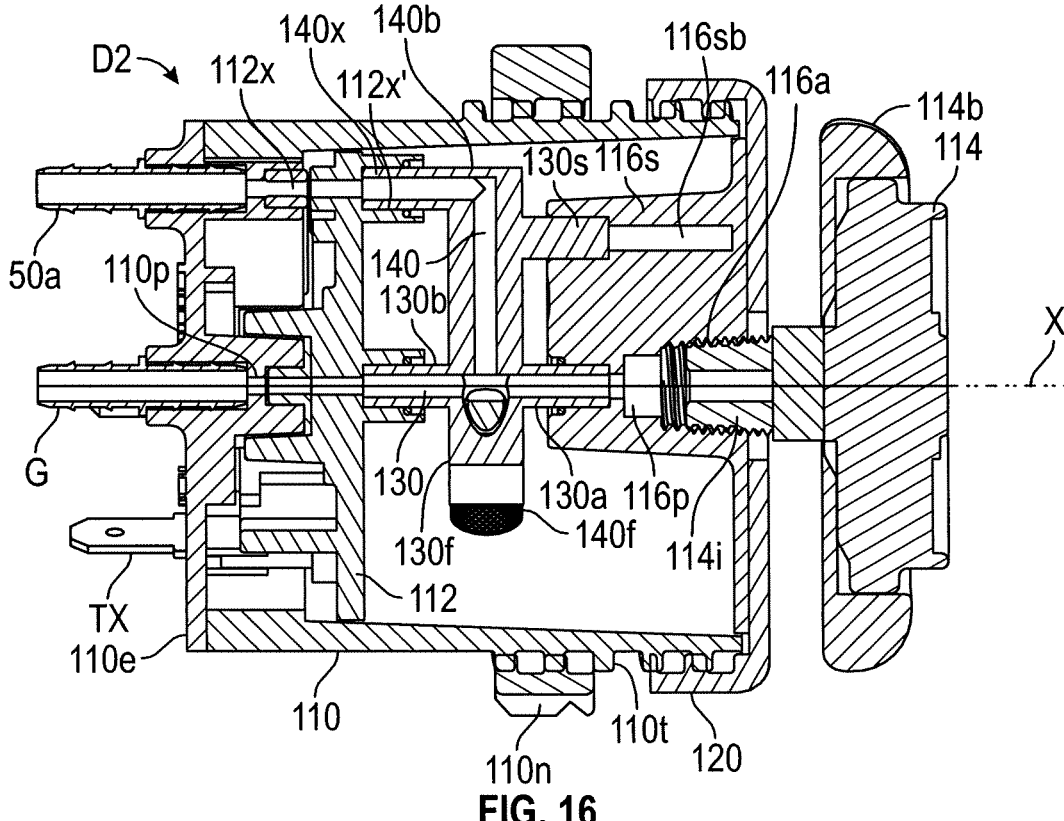

Referring to FIG. 13 and also the exploded views of FIGS. 14A & 14B, the pneumatic pressure gauge 114 is shown as comprising an optional gauge bezel or gauge rim 114b that is non-rotatably connected to the gauge 114 to provide a suitable convenient structure for being grasped by a user to rotate the pressure gauge 114 about the axis of rotation X. As shown, the gauge bezel/rim 114b includes a circular peripheral edge, but this edge can include flats, be scalloped or otherwise be textured and/or formed with a non-circular shape to facilitate a user's manual rotation of the gauge bezel/rim 114b and the gauge 114 about the axis of rotation X. The gauge bezel/rim 114b can be non-rotatably secured to the gauge 14 by a friction fit, an adhesive, a mechanical interlocked structure, and/or otherwise. As shown in FIG. 14B, the gauge inlet fitting 114i includes a hexagonal or other non-circular portion that non-rotatably closely mates with a correspondingly formed and dimensioned aperture 114b1 defined in the gauge bezel/rim 114b.

As described above in relation to the pressure gauge 14 and gauge plate 16, the pressure gauge 114 is similarly non-rotatably connected to the gauge plate 116 such that during normal operative use of the device D2, manual rotation of the pressure gauge 114 in clockwise or counterclockwise directions about the axis of rotation X causes corresponding 1:1 rotation of the gauge plate 116 (and also second body 112) about the axis of rotation X without any relative rotational movement between the fitting 114i and threaded aperture 116a of the gauge plate 116 as would lead to loosening or disconnection of the pressure gauge 114 from the threaded aperture 116a of the gauge plate 116, although the pressure gauge 114 can be intentionally unthreaded from the aperture 116a of the gauge plate for repair and/or replacement by restraining the gauge plate 116 and second body 112 and using force beyond normal operative force to unthread the pressure gauge 114 from the gauge plate 116. The gauge plate 116 is similar to the gauge plate 16 described above except that it further comprises an output portion 116s such as a tab or stud that projects from its inner face 116f away from the pressure gauge 114 (toward the inner end wall 110e of the first (outer) body 110) at a location that is radially offset with respect to the axis of rotation X such that rotation of the pressure gauge 114 and gauge plate 116 about the axis of rotation X causes movement of the output stud or other output portion 116s on a circular arc about the axis of rotation so that the stud or other output portion can be used to rotate the second body 112 about the axis of rotation X as described below. The stud or other output portion 116s can include a slot or bore 116sb.

The pneumatic gauge and pressure control device D2 further includes a main fitting 130f that differs from the main fitting 30 described above in that the main fitting 130 comprises a body 130 that can be a one-piece molded polymeric body. The main fitting body 130 comprises a main airflow position including the main airflow passage 130 (corresponding to the main airflow passage 30 of the main fitting 30) that extends between the first and second connection ports 130a, 130b. The main fitting body 130 further comprises a branch portion 140b including the branch/distribution passage 140 (corresponding to the branch/distribution passage 40) that is fluidically mated with the distribution orifice 112x of the second (inner) body (corresponding to the distribution orifice 12x of the second (inner) body 12). The main fitting 130 is shown separately in the section view of FIG. 18 where it can be seen that the distribution passage 140 can include an open end 140e that facilitate injection molding or other manufacturing of the main fitting body 130, and this open end 140e can be sealed by any suitable plug structure such as a plug fitting 140f.

The second (inner) body 112 differs from the second (inner) body 12 of the device D in that the second body 112 omits the annular wall 12a (i.e., omit the wall segments 12b1, 12b2) of the second (inner) body 12 such that the second body 112 comprises the main wall 12g in the form of a disc-shaped body or structure. The second body 112 operatively and non-rotatably coupled to the gauge plate 116 such that the second body and gauge plate rotate together about the axis of rotation X as a unit when the gauge plate 116 rotates in response to user manual rotation of the pressure gauge 14 in either a clockwise or counter-clockwise direction. The second body 112 can be operably and non-rotatably connected to the gauge plate through any suitable connection or they can even be formed as a one-piece structure or be assembled to form a unit. In the illustrated embodiment, the second body 112 is operatively and non-rotatably coupled to the gauge plate 116 by and through the main fitting 130 which is, itself, operatively and non-rotatably coupled to both: (i) the second body 112 on an inner side of the main fitting 130; and (ii) the gauge plate 116 on an opposite outer side of the main fitting 130. More particularly, with reference to FIGS. 15-18, the first connection port 130a of the main fitting 130 is operatively physically engaged with the gauge plate 116 in fluid communication with the gauge inlet passage 116p (e.g., received within or otherwise physically mated with the gauge inlet passage 116p), and the opposite, second connection port 130b is operatively physically engaged with the second body 112 in fluid communication with the secondary air outlet passage 112p (e.g., received within or otherwise physically mated with the secondary air outlet passage 112p) such that the main airflow passage 130 of the main fitting 130 extends between and fluidically interconnects the secondary air outlet passage 112p (and also the primary air outlet passage 110p) with the gauge inlet passage 116p. The main airflow passage 130 is arranged coaxially with the axis of rotation X. O-ring or other seals R5 (FIGS. 14A, 14B) can be provided to seal the connections between the first and second connection ports 130a, 130b and the gauge plate 116 and second body 112, respectively. Also, an outer end 140x of the branch portion 140b is operably physically engaged with or operatively connected to the second body 112 at a location that is radially offset with respect to the axis of rotation X and in fluid communication with the distribution orifice 112x of the second body (corresponding to the distribution orifice 12x of the second (inner) body 12). In the illustrated example, the outer end 140x of the branch distribution portion 140b is received within an enlarged portion such as a counterbore

112x′ of the distribution orifice 112x but other arrangements are contemplated such as the outer end 140x being mated with a fitting that is connected to the distribution orifice 112x and/or by a portion of the second body 112 being received within or otherwise connected with the outer end 140x of the branch distribution portion 140b.

Figure 17:
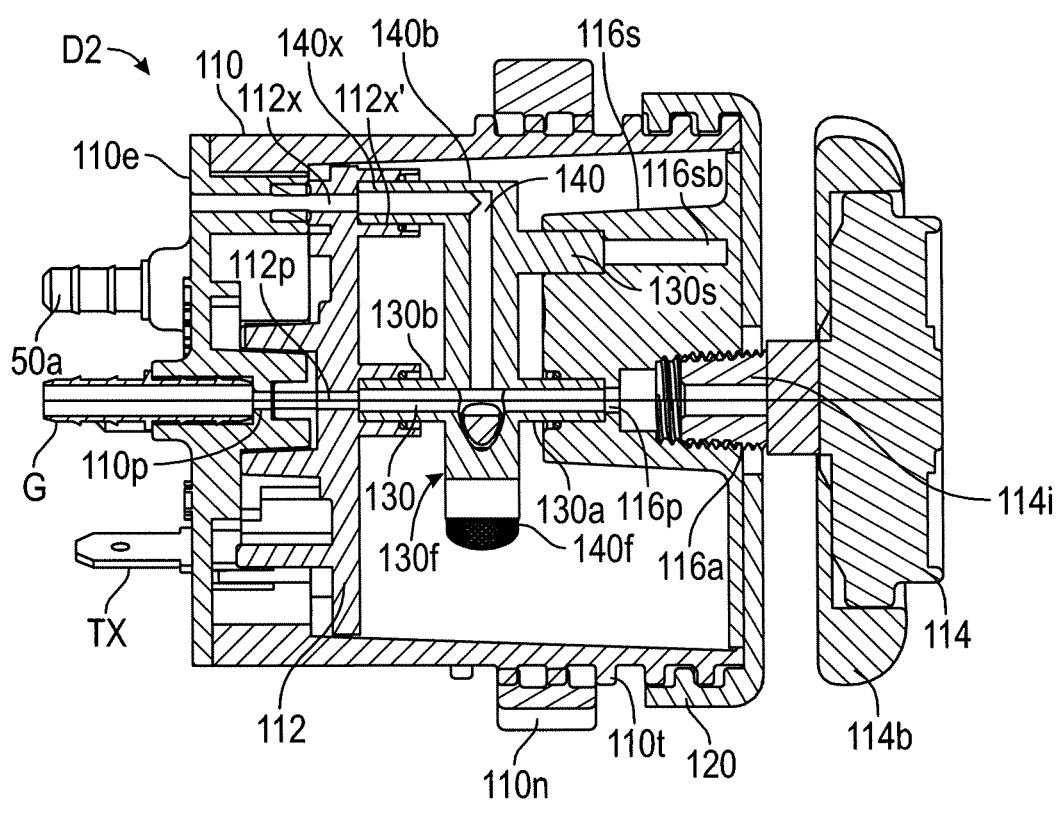
Figure 18:
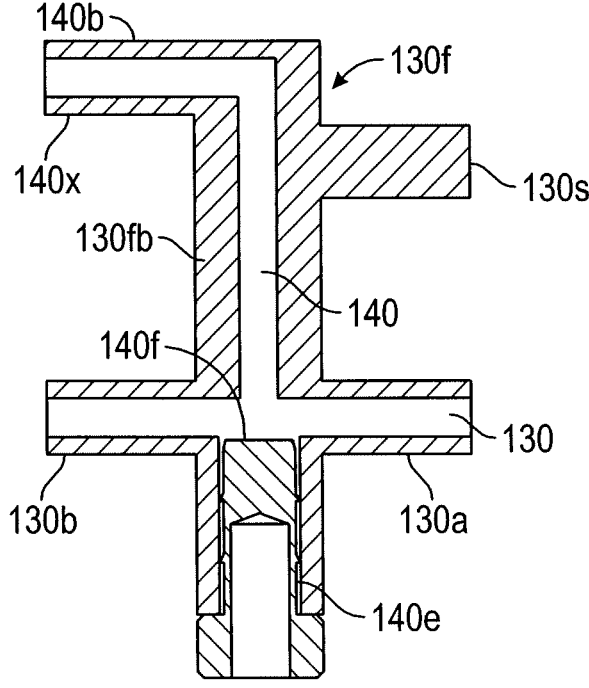

The outer end 140x of the branch distribution portion 140b is radially offset relative to the axis of rotation X such that rotation of the main fitting 130 about the axis of rotation X causes the outer end 140x to move on a circular arc about the axis of rotation, and such movement of the outer end 140x induces rotation of the second (inner) body 112 about the axis of rotation X due to the engagement of the branch distribution passage outer end 140x with the second (inner) body 112. This rotation of the main fitting 130 about the axis of rotation X results from a user's manual movement of the pressure gauge 114 about the axis of rotation in either a clockwise or counter-clockwise direction against the biasing force of the spring S. As described above, the spring S resiliently returns the second body 112 to its first or neutral position to provide the first or neutral operative state of the device D2 when manual force on the pressure gauge 114 is released. More particularly, the main fitting 130 can comprise a torque input portion or stud 130s that is radially offset with respect to the axis of rotation X and that is operatively physically engaged with or operatively connected to the gauge plate 116 such as, for example, to the output stud 116s of the gauge plate 116 such as by being received within the bore 116sb of the output stud 116s or vice versa with the output stud 116s of the gauge plate received in a bore or slot of the input stud 130s of the main fitting 130 or otherwise operatively connected to the gauge plate 116 such that movement of the gauge plate output stud 116s on an arc about the axis of rotation X induces corresponding movement of the input stud 130s and the entire main fitting 130 on an arc about the axis of rotation X in the same direction which, in turn, induces movement of the second (inner) body 112 about the axis of rotation X due to the operative connection of the outer end 140x of the branch distribution passage 140 with the second (inner) body 112. As such, a user can manually rotate the pressure gauge 114 about the axis of rotation X to cause rotation of the second body 112 about the axis of rotation X to move the second body 112 from the first (neutral) position which defines the first or neutral operative state of the device D2 (FIG. 15) to either: (i) the second (fill) operative position to place the device D2 in its second or fill operative state (FIG. 16); or (ii) the third (vent) operative position to place the device D2 in its third or vent operative state (FIG. 17). In its free state, such as when the user releases the pressure gauge 14, the spring S resiliently returns the second body 112 to the first or neutral position to automatically return the device D2 to its default or normal condition of being in the first or neutral operative state in which airflow into or out of the main airflow passage 130 and the associated pneumatic system V is blocked.

The present pneumatic gauge and pressure control device D, D′, D″, D2 enables a method for adding or removing compressed air from a tire, air spring or any other pneumatic device or system V by manually rotating or otherwise moving the pneumatic gauge 14, 114 itself rather than by manipulating a switch or valve or other component that is separate from the pneumatic gauge 14, 114. The present method can include manually moving a pneumatic gauge from a neutral position to a fill position where compressed air is communicated from an associated source into an associated device or system such as a tire or air spring. The method can further include manually moving the pneumatic gauge from the neutral position or from the fill position to a vent position where compressed air is vented from the tire, air spring, or other associated device or system. The method can include manually rotating the pneumatic gauge about an axis of rotation to the fill and/or vent positions. In one embodiment, the method includes rotating the pneumatic gauge from the neutral position in a first direction to the fill position and from the neutral position in a second direction to the vent position. The method can include providing electrical output based upon the position of the pneumatic gauge and/or can include selectively connecting the tire, air spring, or other pneumatic system to an air inlet passage and/or a vent depending upon the operative position to the pneumatic gauge.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A pressure control device comprising a first body and a pneumatic gauge movably connected to said first body and including a face that provides a visual indication of pneumatic pressure, wherein said pneumatic gauge including said face is manually movable relative to said first body from a neutral position to: (i) a fill position in which the pressure control device causes compressed air to be communicated from an associated compressed air source into an associated device or system; (ii) a vent position in which the pressure control device causes compressed air to be vented from the associated device or system, wherein the fill position and the vent position are obtained respectively by one of: (i) rotating the pneumatic gauge in first and second angular directions from the neutral position; (ii) rotating the pneumatic gauge in a single angular direction by first and second different angular distances from the neutral position.

2. The pressure control device as set forth in claim 1, wherein said device provides a path for compressed air to flow from the associated compressed air source to the associated device or system when the pneumatic gauge is located in the fill position.

3. The pressure control device as set forth in claim 2, wherein said device provides a path for compressed air to flow from the associated device or system to a vent when the pneumatic gauge is located in the vent position.

4. The pressure control device as set forth in claim 1, wherein said device comprises at least one electrical switch that provides an electrical output that controls at least one valve, wherein, in response to said electrical output, said at least one valve: (i) allows flow of compressed air from the associated compressed air source to the associated device or system through said at least one valve when the pneumatic gauge is located in the fill position; (ii) allows flow of compressed air from the associated device or system to the vent through said at least one valve when the pneumatic gauge is located in the vent position; (iii) blocks flow of compressed air into or out of the associated device or system when the pneumatic gauge is located in the neutral position.

5. The pressure control device as set forth in claim 1, wherein said device provides an electrical output that causes an associated air compressor of the associated compressed air source of compressed air to be energized when the pneumatic gauge is located in the fill position.

6. The pressure control device as set forth in claim 5, wherein the associated air compressor is directly or indirectly in fluid communication with the associated device or system and is adapted to supply compressed air to the associated device or system directly and/or through the pressure control device when the associated air compressor is energized when said pneumatic gauge is located in the fill position.

7. The pressure control device as set forth in claim 1, comprising:
   said first body comprising an air inlet passage adapted to be connected to the associated compressed air source and a primary air outlet passage;
   a second body that moves relative to the first body from a first operative position to a second operative position, wherein said pneumatic gauge is operably connected to said second body to move together with said second body, said second body comprising a distribution orifice;
   a main airflow passage that fluidically connects said primary air outlet passage to said pneumatic gauge;
   a branch distribution passage that fluidically connects said main airflow passage to said distribution orifice of said second body;
   wherein said second body is located in said second operative position in which the distribution orifice is in fluid communication with said air inlet passage of said first body when said pneumatic gauge is moved to the fill position such that said primary air outlet passage of said first body is also in fluid communication with said air inlet passage of said first body through said main airflow passage and said branch distribution passage when said pneumatic gauge is moved to the fill position.

8. The pressure control device as set forth in claim 7, wherein said first body further comprises a vent passage that communicates with an ambient atmosphere external to said first body, and wherein said second body is located in a third operative position in which said distribution orifice is in fluid communication with said vent passage of said first body when said pneumatic gauge is moved to the vent position such that said primary air outlet passage of said first body is also in fluid communication with said vent passage of said first body through said main airflow passage and said branch distribution passage when said pneumatic gauge is moved to the vent position.

9. The pressure control device as set forth in claim 8, wherein said first body further comprises an airflow stop, and wherein said second body is located in said first operative position in which the distribution orifice is in fluid communication with said airflow stop of said first body when said pneumatic gauge is moved to the neutral position such that said airflow stop blocks airflow into or out of said distribution orifice when said pneumatic gauge is moved to the neutral position.

10. The pressure control device as set forth in claim 9, wherein said second body is rotatably connected to said first body for rotation about said axis such that said pneumatic gauge and said second body rotate relative to said first body about said axis when said pneumatic gauge is moved said fill position and said vent position.

11. The pressure control device as set forth in claim 7, further comprising a spring that resiliently biases the pneumatic gauge: (i) from the fill position toward the neutral position; and (ii) from the vent position toward the neutral position.

12. The pressure control device as set forth in claim 7, wherein said main airflow passage and said branch distribution passage are provided in a main fitting, and wherein said main fitting non-rotatably connects said pneumatic gauge to said second body such that said pneumatic gauge and said second body rotate as a unit about said axis.

13. The pressure control device as set forth in claim 12, wherein said main fitting comprises:

a main portion including said main airflow passage;

a branch portion that comprises said branch distribution passage, wherein said branch portion includes an outer end that is radially offset from said axis; and a torque input portion that is radially offset from said axis;

wherein said toque input portion is operably coupled to rotate about said axis with said pneumatic gauge and said outer end of said branch portion is operably engaged with said second body to rotate with said second body about said axis.

14. The pressure control device as set forth in claim 13, wherein said pneumatic gauge is non-rotatably engaged with a gauge plate such that said pneumatic gauge and gauge plate rotate as a unit about said axis, said gauge plate comprises a torque output portion that is operably engaged with said torque input portion of said main fitting to operably couple the pneumatic gauge to the main fitting.

15. The pressure control device as set forth in claim 7, further comprising external threads on said first body adapted to be engaged by a mounting nut to secure the first body to an associated panel or other associated mounting structure.

16. The pressure control device as set forth in claim 15, further comprising a bezel engaged with the external threads of the first body, wherein said bezel axially captures said second body to said first body.

17. The pressure control device as set forth in claim 7, wherein said first body comprises a cup-like structure including an annular wall that defines a main bore, said first body comprising an inner end wall that extends across and at least partially closes an inner end of the main bore, wherein the air inlet passage and the primary air outlet passage are located in said inner end wall.

18. The pressure control device as set forth in claim 1, wherein the device is installed in a pneumatic system comprising an air spring.

19. The pressure control device as set forth in claim 18, wherein the pneumatic system further includes a compressed air source comprising at least one of an air tank and an air compressor.

* * * * *